United States Patent [19]
Sasaki et al.

[11] Patent Number: 5,668,786
[45] Date of Patent: Sep. 16, 1997

[54] MAGNETO-OPTIC DISK APPARATUS HAVING MEANS FOR ELIMINATING FLUCTUATION COMPONENT IN REPRODUCTION MAGNETO-OPTIC SIGNAL

[75] Inventors: Tohru Sasaki, Yokohama; Takeshi Shimano, Tokorozawa; Yoshiro Konishi; Toshimasa Kamisada, both of Hiratsuka; Motoyuki Suzuki; Naoki Mori, both of Yokohama; Masayuki Fukui, Hiratsuka, all of Japan

[73] Assignee: Hitachi, Ltd., Tokyo, Japan

[21] Appl. No.: 634,360

[22] Filed: Apr. 18, 1996

[30] Foreign Application Priority Data

Apr. 19, 1995 [JP] Japan .................................. 7-093703
Aug. 22, 1995 [JP] Japan .................................. 7-212275

[51] Int. Cl.⁶ .................................................. G11B 11/00
[52] U.S. Cl. .................................. 369/13; 369/112
[58] Field of Search ................... 369/13, 14, 112, 369/44.26, 44.41, 44.42, 54; 360/59, 114; 365/122

[56] References Cited

U.S. PATENT DOCUMENTS

| | | | |
|---|---|---|---|
| 4,774,615 | 9/1988 | Revelli et al. | 369/13 |
| 4,779,250 | 10/1988 | Kogure et al. | 369/13 |
| 5,481,530 | 1/1996 | Ueda et al. | 369/112 |

FOREIGN PATENT DOCUMENTS 62-65255  3/1987  Japan ........................ 369/13

OTHER PUBLICATIONS

K. Seo et al., "Error Propagation due to Dust on a Thin-Substrate Disk", *Proceedings of the International Symposium on Optical Memory, Sapporo, Dec. 1991, Japanese Journal of Applied Physics Series 6*, pp. 297–299, Dec. 1991.

N. Murayama et al., *Optical Disk Technique*, pp. 335–338, published in Japan by Radio Gijutsu, Ltd., on Jul. 20, 1992 (in Japanese).

*Primary Examiner*—Tan Dinh
*Attorney, Agent, or Firm*—Antonelli, Terry, Stout & Kraus, LLP

[57] ABSTRACT

A magneto-optic disk apparatus for use with a magneto-optic disk in which a recording surface made of a magneto-optic information recording medium is formed on a transparent substrate having a birefringence. The magneto-optic disk apparatus includes an optical head for performing a recording and a reproduction by a laser beam for the recording surface, and a unit for eliminating a fluctuation component occurring in a reproduction magneto-optic signal, the fluctuation component eliminating unit being arranged in a convergent light up to an analyzer in a detection optical system.

12 Claims, 19 Drawing Sheets

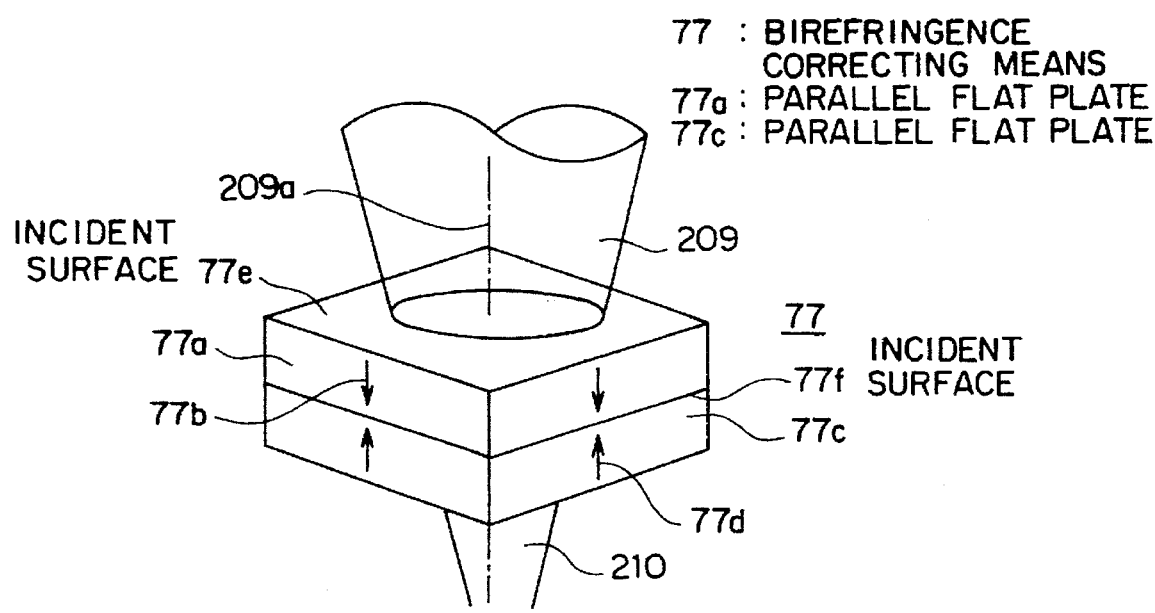
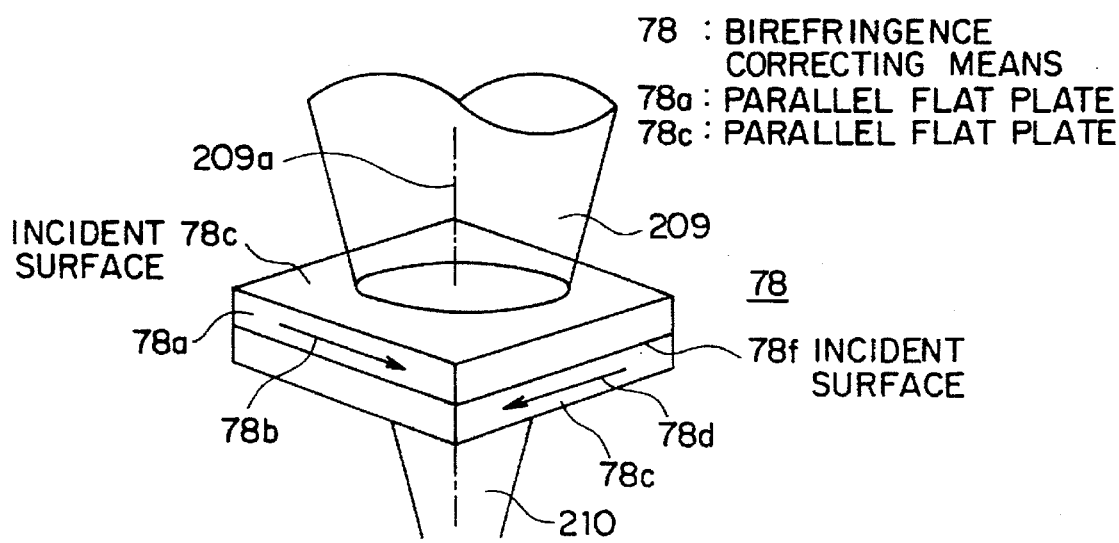

DISK TANGENTIAL DIRECTION
209c
DISK RADIAL DIRECTION
501a ELLIPTIC DISTRIBUTION
501b ELLIPTIC DISTRIBUTION
501c ELLIPTIC DISTRIBUTION

MAGNETO-OPTIC DISK APPARATUS HAVING MEANS FOR ELIMINATING FLUCTUATION COMPONENT IN REPRODUCTION MAGNETO-OPTIC SIGNAL

BACKGROUND OF THE INVENTION

The invention relates to a magneto-optic disk apparatus and, more particularly, to a magneto-optic disk apparatus in which a reproduction signal is detected from a magneto-optic disk as a recording medium, manufactured by using a disk substrate having a birefringence, by using a differential detection method.

Hitherto, as a magneto-optic disk apparatus, an apparatus disclosed in JP-A-62-65255 has been known. FIG. 1 is a schematic diagram of a magneto-optic disk and a reading optical system disclosed as FIG. 1 in the above Official Gazette.

A light beam emitted from a semiconductor laser 3A as a laser device is converted into a parallel light by a collimator lens 4A and an isotropy of an intensity of the laser beam is converted into an anisotropy by a shaping prism 5A. After that, the laser beam passes through a first beam splitter 6A and its progressing direction is changed by a mirror 7A. After that, the laser beam is irradiated onto a magneto-optic disk 1A through an objective lens 8A. As shown in an example of FIG. 2, for instance, the magneto-optic disk 1A has a structure such that a magneto-optic recording medium 1b is formed on a transparent substrate 1a. The laser beam entering the magneto-optic disk 1A passes through the transparent substrate 1a and is irradiated onto the magneto-optic recording medium 1b (hereinafter, simply referred to as a recording surface 1b). The structure of the magneto-optic disk 1A using polycarbonate as a substrate as shown in FIG. 2 is disclosed in, for example, a literature of "Optical Disk Technique", published by Radio Gijutsu Co., Ltd., pages 330 etc., Jul. 20, 1992.

A reflected light from the magneto-optic disk 1A passes through the objective lens 8A and mirror 7A and is reflected by the beam splitter 6A and progresses toward a second beam splitter 9A. A reflecting surface of the beam splitter 9A has a predetermined light transmittance and a predetermined reflectance. The incident light beam is divided into two lights of a transmission light and a reflected light.

Between them, the transmission light passes through a detecting lens 16A and, after that, an astigmatism is given to the light through a cylindrical lens 17A. The light enters a PIN photodiode 18A and is used to detect a focusing error by an astigmatism method. A tracking error is detected by the PIN photodiode 18A by, for example, a push-pull method.

The reflected light which was reflected by the second beam splitter 9A passes through a half wave length plate 11A, so that a polarized light is rotated by 45°. After that, the light is converted into a convergent light by a lens 12A and enters a polarization beam splitter 13A and is separated into two light beams whose polarized lights perpendicularly cross. The two light beams enter APD photodiodes 14A and 15A, respectively. A magneto-optic signal recorded on the magneto-optic disk 1A is reproduced by a detecting method, namely, a differential detecting method whereby a difference between detection signals of the APD photodiodes 14A and 15A is obtained by a subtracter such as a differential amplifier or the like (not shown).

According to the conventional optical head as mentioned above, however, as shown in FIG. 2, in the case where dust D or the like is deposited on the transparent substrate 1a having a refringence of the magneto-optic disk 1A, the magneto-optic signal fluctuates. Such a fluctuation changes depending on a size of dust, a position of dust D in the light beam entering onto the transparent substrate 1a, and further, a refringence value of the transparent substrate 1a. In the worst case, as shown in FIG. 3, a DC level of the magneto-optic signal changes like an S-shape. The above phenomenon will now be described hereinbelow with reference to the drawings.

Generally, a polycarbonate substrate (hereinafter, simply referred to as a PC substrate) which is cheap and has a good mass-productivity is used as a material of the transparent substrate of the magneto-optic disk. The PC substrate has a birefringence. FIG. 4 shows a refractive index ellipsoid (distribution of a refractive index due to the polarizing direction) 212 indicative of the birefringence of the PC substrate. The refractive index ellipsoid 212 of the PC substrate can be expressed as a negative uniaxial anisotropy medium in which the direction of an optic axis is set to the direction of a plate thickness and a refractive index Ne of an extraordinary light is smaller than a refractive index No of an ordinary light (accurately speaking, biaxial anisotropy medium in which a refractive index in the radial direction and a refractive index in the tangential direction in the plane of the disk are different and an optic axis is also slightly deviated from the direction of the plate thickness).

FIG. 5 schematically shows a refractive index in the incident direction of the light at an arbitrary position in the light beam and a linearly polarized light of incidence in the case where a parallel light beam 100 of the optical head (FIGS. 1 and 2) in the above conventional technique is converged onto the recording surface 1b by the objective lens 8A and is again reflected and, after that, the light beam passes through the PC substrate or the like as a negative uniaxial anisotropy medium mentioned above. In the diagram, since the center light beam is the incident light beam from the direction of the optic axis of the negative uniaxial anisotropy medium, the refractive index has a circular distribution 300. The other light beams obliquely progress for the plate thickness direction of the transparent substrate 1a as shown in FIG. 2. Therefore, since the light beams become the incident light beams in the directions other than the optic axis direction of the negative uniaxial anisotropy medium, the refractive index has an elliptic distribution 301. As for an elliptic ratio (ratio of the major axis and the minor axis) of the ellipse, since the light beam (102) progresses in a manner such that as the light at the outer periphery of the light beam (102) has a larger inclination with respect to the optic axis of the negative uniaxial anisotropy medium, the elliptic ratio of the refractive index is large. Namely, the major axis of the ellipse shows the refractive index No of the negative uniaxial anisotropy medium shown in FIG. 4 and the minor axis of the ellipse of the light at the outer periphery decreases from the refractive index Ne in accordance with the outer peripheral position. A change amount in this case depends on an angle α of incidence (FIG. 2) to the transparent substrate 1a.

FIG. 6 schematically shows a polarization state in a certain radius in a reflected light beam 102 in the case where the parallel light beam 100 is converted into a convergent light 101 by the objective lens 8A of the optical head (FIGS. 1 and 2) in the above conventional technique, the convergent light 101 passes through the transparent substrate 1a which gives a refractive index distribution of FIG. 5 and is irradiated onto the recording surface 1b and, after that, the light is again reflected by the magneto-optic disk 1A and is converted into the parallel light as a reflected light beam 102 by the objective lens 8A. In the diagram, the polarized light corresponding to the radial direction or tangential direction is a linearly polarized light 102a (it is now assumed that there is no rotation of the plane of polarization due to a magneto-optic effect) in which the polarization state (FIG. 5) of the parallel light beam 100 entering the magneto-optic disk 1A is held. The polarized light in a region other than the radial direction or tangential direction, however, becomes an elliptically polarized light 102b. In the diagram, a phase difference (the direction of the major axis and the elliptic ratio) of the actual elliptically polarized light differs in accordance with the position of the incident light beam, namely, the incident angle α (FIG. 2) to the transparent substrate 1a or an angle β with the polarizing direction of incidence.

When the reflected light beam 102 having a disturbance of the polarization state shown in FIG. 6, namely, a polarization distribution enters a differential detecting system (reflection optical system of the second beam splitter 9A in FIG. 1) and becomes a light beam 103 reflected by the polarization beam splitter 13A as an analyzer and a light beam 104 which was transmitted, their intensity distributions become different light/dark intensity distributions as shown in FIG. 7. As shown in the diagram, therefore, reduction amounts of the light amount due to an influence by the dust on the transparent substrate 1a differ depending on the light beams 103 and 104. Namely, when there is a dust A at positions in FIGS. 7A and 7B with respect to the light beam 103 since the light portion of the intensity of the light beam 103 is shielded (regions 103x and 103y in FIG. 7A) by the dust, the reduction of the light amount is large. On the other hand, since the dark portion of the intensity of the light beam 104 is shielded (regions 104x and 104y in FIG. 7B) by the dust, the reduction of the light amount is small. The reason why the light shielding portions by the dust exist at two positions in the light beam in the diagram is because one dust in the diagram exists at a position that is deviated from the center of the light beam. Namely, this is because the regions 103x and 104x where the light beam is shielded on the incident light beam side (before reaching the recording surface 1b) and the regions 103y and 104y where the light beam after it was reflected by the disk is shielded are caused. Therefore, when the position of the dust A in FIGS. 7A and 7B is moved by the rotation of the magneto-optic disk 1A and the dust A arrives at positions in FIGS. 8A and 8B, in a manner opposite to the case of FIGS. 7A and 7B, since the dark portion of the intensity of the light beam 103 is shielded (regions 103x' and 103y' in FIG. 8A) by the dust, the reduction of the light amount is small and, since the light portion of the intensity of the light beam 104 is shielded (regions 104x' and 104y' in FIG. 8B) by the dust, the reduction of the light amount is large. Therefore, after the light beams 103 and 104 entered the APD photodiodes 14A and 15A, respectively, a DC level (the DC level is generally optically set to the 0 level in case of differentially detecting) of the magneto-optic signal which is obtained by performing a subtraction by a subtracter is shown like an S-shape as shown in FIG. 3. Generally, as a signal process to demodulate a waveform of the magneto-optic signal into a data signal, as shown in FIG. 9, the magneto-optic signal is binarized (High level, Low level) by a predetermined slice level (level at which the signal is symmetrically sliced at the center of the signal), thereby converting into a rectangular wave pulse signal. When the DC level of the magneto-optic signal fluctuates due to the factors as mentioned above, a deviation occurs in the center of the magneto-optic signal for the slice level (the signal is asymmetrically sliced). There is, consequently, a subject such that the magneto-optic signal cannot be converted into the rectangular wave pulse which was correctly binarized and a signal detection error occurs.

In the foregoing conventional technique, therefore, a compensator or phase plate 10A is provided in the detection optical system (parallel light beam) of the optical head in order to compensate a birefringence occurring in the transparent substrate 1a.

The phase difference in the reflected light beam occurring in the transparent substrate 1a, however, is not a constant phase difference but has a distribution as shown in an example of FIG. 6. Therefore, a technical subject such that the refringence cannot be compensated by the technique in which the compensator or phase plate 10A which causes a predetermined phase difference into the parallel beam arriving at the detection optical system as in the above conventional technique still remains.

SUMMARY OF THE INVENTION

It is an object of the invention to provide a magneto-optic disk apparatus in which in the case where a magneto-optic disk using a material having a birefringence as a transparent substrate is used as a recording medium, recording information can be accurately read out without being influenced by a deposition of a foreign matter such as dust, fouling, or the like onto the magneto-optic disk.

Another object of the invention is to provide a magneto-optic disk apparatus in which in the case where a magneto-optic disk using a material having a birefringence as a transparent substrate is used as a recording medium, noises which are caused due to a foreign matter such as dust, fouling, or the like deposited on the magneto-optic disk are eliminated and recording information can be accurately read out without making a software for processing the read signal complicated.

Still another object of the invention is to provide a magneto-optic disk apparatus which can accurately read out recording information under a bad use environment with a large quantity of dust or the like without being influenced by a deposition of a foreign matter such as dust, fouling, or the like onto a magneto-optic disk.

Further another object of the invention is to provide a magneto-optic disk which can improve an S/N ratio of a reproduction magneto-optic signal even if there is no dust on a magneto-optic disk made of a material having a birefringence.

According to the invention, there is provided a magneto-optic disk apparatus including an optical head having a detection optical system for detecting a magneto-optic signal from a reflected light beam from a magneto-optic disk, wherein birefringence correcting unit having an optical anisotropy is arranged in an optical path of the reflected light beam which was reflected from the magneto-optic disk and reaches an analyzer provided in the detection optical system. As birefringence correcting unit, for example, a positive or negative uniaxial anisotropy medium can be used. A structure such that a plurality of uniaxial anisotropy media are adhered can be also used in accordance with physical properties of the uniaxial anisotropy medium which is used.

According to the magneto-optic disk apparatus of the invention mentioned above, an uneven state of the distribution of the polarization amount around the optic axis of the reflected light which passes through a substance having a birefringence and constructing the magneto-optic disk and enters the detection optical system is set off by the refringence correcting unit arranged on the optical path of the reflected light in front of the detection optical system and the distribution of the light amount around the optic axis of the reflected light becomes uniform. Therefore, for example, in case of performing a differential detection such that the reflected light from the magneto-optic disk is branched and the light amounts are detected by two photodetectors and a difference between the detected light amounts. is used as a read signal, the reduction amounts of the light amounts due to the shadow in the reflected light which are caused due to a foreign matter such as dust, fouling, or the like on the magneto-optic disk are equal in the two photodetectors. Therefore, the occurrence of a fluctuation of the detection signal level is suppressed and the information recorded on the magneto-optic disk can be accurately read out without being influenced by the existence of the foreign matter such as dust, fouling, or the like on the magneto-optic disk.

To accomplish the above object, according to the invention, the reflected light from the magneto-optic disk is detected by at least one of the light receiving regions of a 4-split photodetector, a sum signal of outputs in light receiving regions having a diagonal positional relation among the light receiving regions of the 4-split photodetector is calculated, a level fluctuation component included in the reproduction magneto-optic signal is detected, and the level fluctuation component is subtracted from the reproduction magneto-optic signal.

When the laser beam is irradiated to the portion of the information track of the magneto-optic disk on which a dust or the like is deposited, in the spot of the laser beam on the 4-split photodetector, the light amounts in the light receiving regions with the diagonal positional relation decrease by the same light amount due to the influence by the dust or the like. Therefore, two sum signals of the outputs of the light receiving regions with the diagonal positional relations are respectively obtained and a difference between the two sum signals is calculated, thereby obtaining the level fluctuation component according to the reduction of the light amount due to the dust or the like. The reproduction magneto-optic signal is derived from the magneto-optic disk by arithmetically operating the outputs of the photodetectors including the 4-split photodetector by the differential method. However, by subtracting the level fluctuation component from the reproduction magneto-optic signal, the level fluctuation due to the deposition of the dust or the like onto the information track is corrected and the reproduction magneto-optic signal at the stable level can be derived.

BRIEF DESCRIPTION OF THE DRAWINGS

FIG. 17 is a perspective view showing a modification of a construction of the birefringence correcting unit of the optical head in the embodiment;

FIG. 18 is a perspective view showing another modification of a construction of the birefringence correcting unit of the optical head in the embodiment;

DESCRIPTION OF THE PREFERRED EMBODIMENTS

Figure 10:
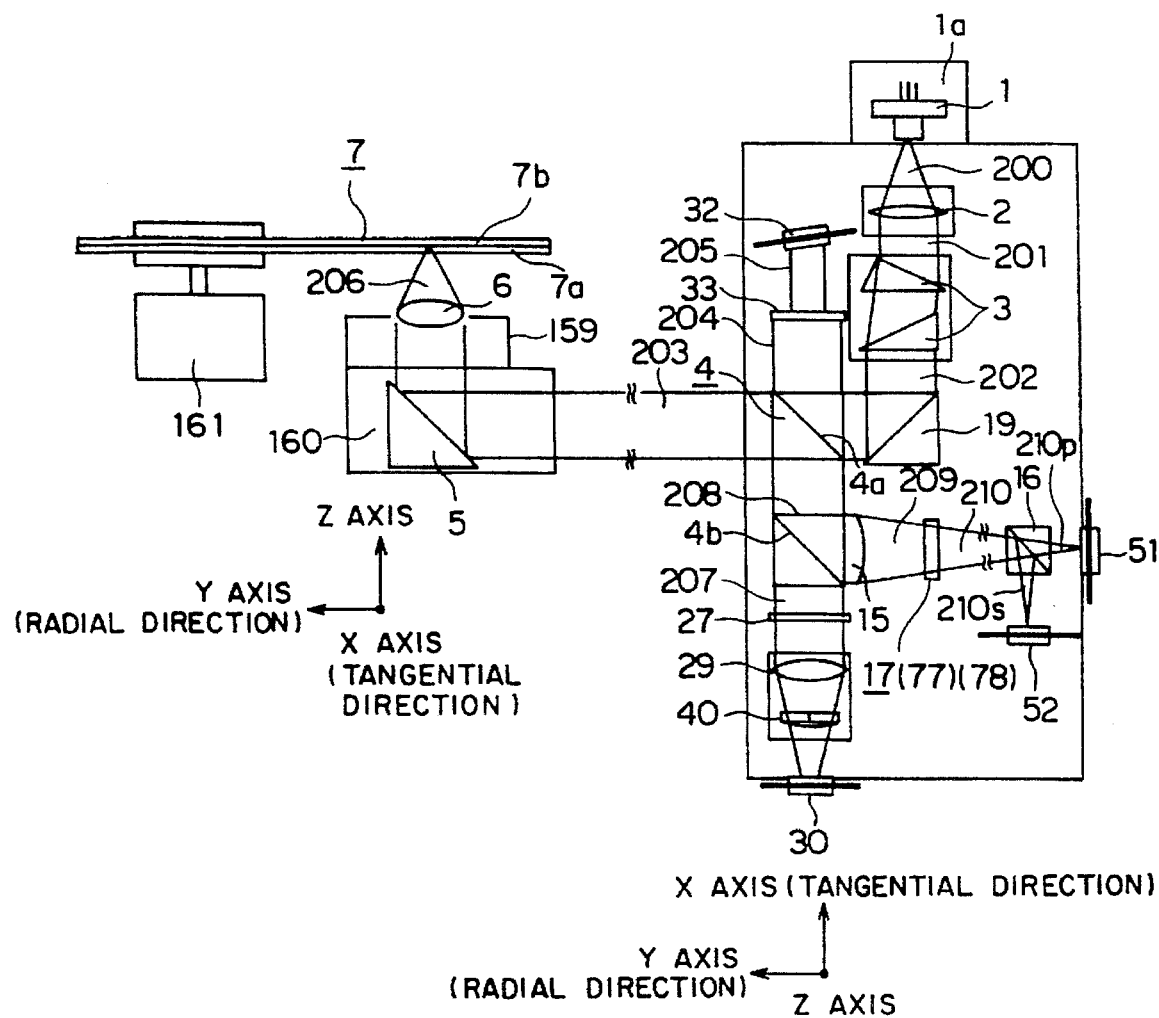
FIG. 10 is a schematic constructional diagram showing an example of an optical head of a magneto-optic disk apparatus according to an embodiment of the invention.

FIG. 10 is a conceptual diagram showing an example of a construction of an optital head in a magneto-optic disk apparatus according to an embodiment of the invention.

In FIG. 10, a light beam 200 emitted from a semiconductor laser 1 (with a high frequency multiplexing circuit 1a to reduce noises of the semiconductor laser) serving as a laser device is converted into a parallel light beam 201 by a collimator lens 2. An anisotropy of an intensity of a laser beam is corrected by a beam shaping prism 3, so that the light beam is converted into a parallel light beam 202 having an isotropy.

An optical path of the parallel light beam 202 which is emitted from the beam shaping prism 3 is deflected by 90° by a reflecting mirror 19 and, after that, the deflected light beam enters a first reflecting surface 4a of a first beam splitter 4. Reflectances and transmittances of the first reflecting surface 4a of the beam splitter 4 are different with respect to the P polarized light and S polarized light. For example, the first reflecting surface 4a has polarization characteristics such that a transmittance Tp of the P polarized light is (Tp≈0.7), a reflectance Rp of the P polarized light is (Rp≈0.3), a transmittance Ts of the S polarized light is (Ts≈0), and a reflectance Rs of the S polarized light is (Rs≈1). The parallel light beam 202 (P polarized light) entering the first reflecting surface 4a is divided into two lights of a transmission light 203 and a reflected light 204.

Among them, the reflected light 204 enters a light shielding member 33 having a limiting aperture (although not shown in particular, circular limiting aperture in the embodiment). A light beam 205 transmitted through the limiting aperture portion enters a photodetector 32. The photodetector 32 is arranged obliquely for the light beam 205 as a countermeasure for a stray light (countermeasure for preventing that the unnecessary light which is reflected at the incident surface, namely, a stray light enters the semiconductor laser 1 or other photodetector). The light shielding member 33 is not always necessary but the reflected light 204 can be also directly led to the photodetector 32 or a lens or the like can be also used. A light intensity of the light beam 200 which is emitted from the semiconductor laser 1 is controlled by the photodetector 32. A description about such a control is omitted because it is not essentially related to the invention.

Figure 1:
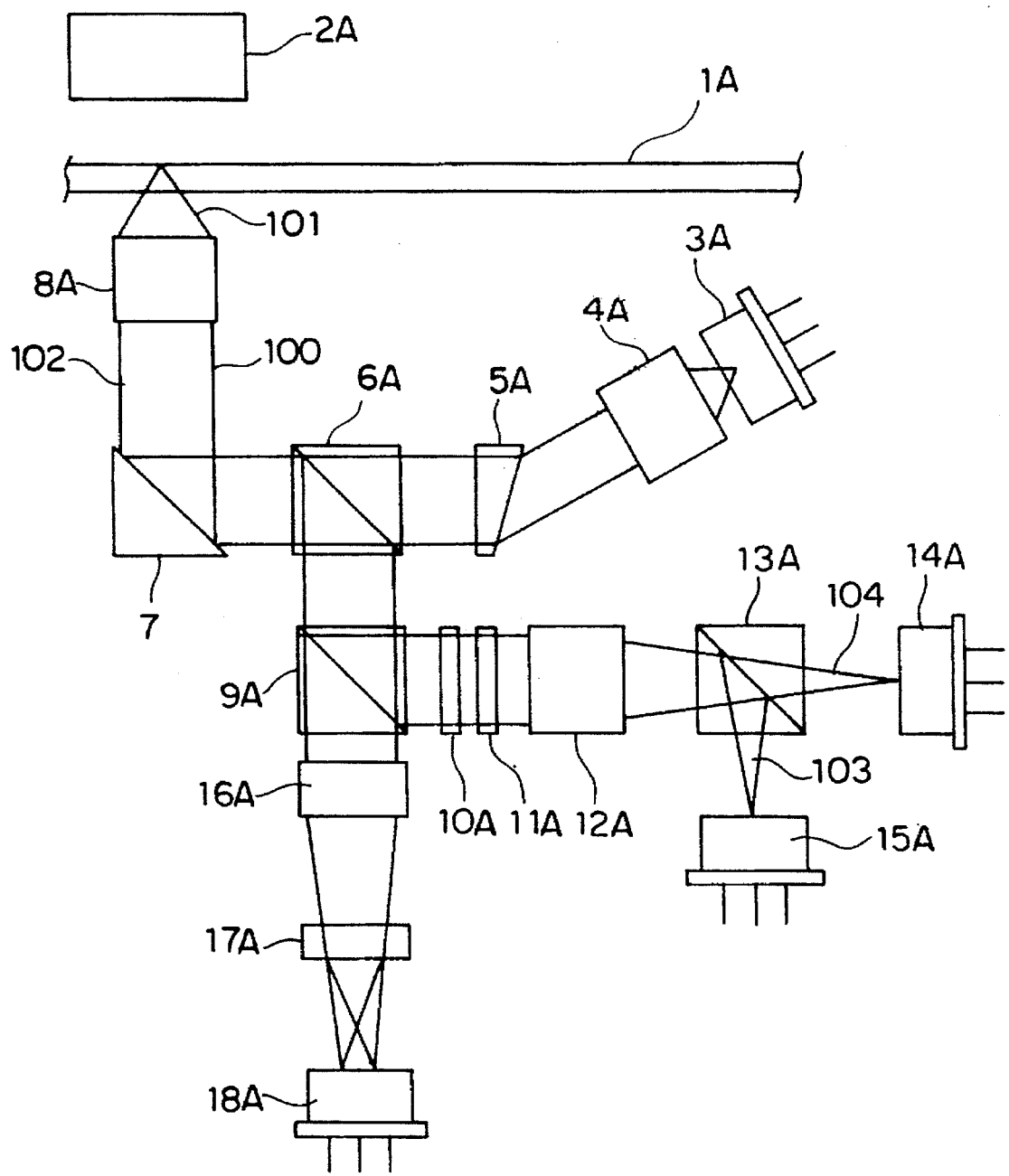
FIG. 1 is a schematic constructional diagram showing an example of a conventional magneto-optic disk recording apparatus.
Figure 2:
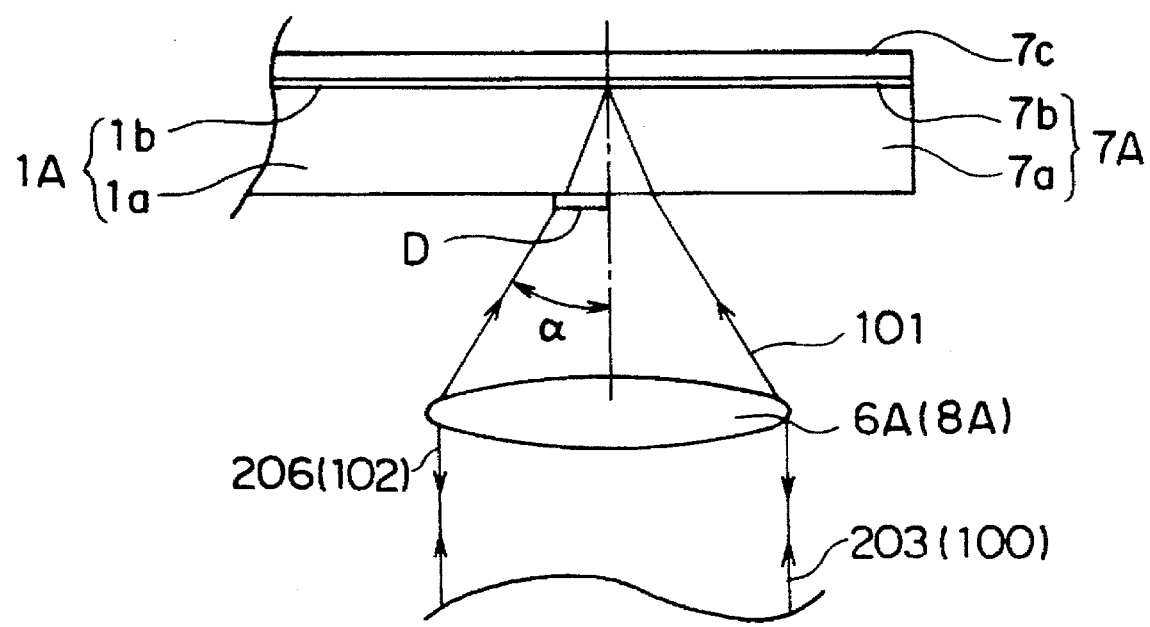
FIG. 2 is a schematic cross sectional view showing the relation between a laser beam that is converged by an objective lens and a dust on the surface of a magneto-optic disk.

A progressing direction of the transmission light 203 transmitted through the first reflecting surface 4a of the first beam splitter 4 is changed by a reflecting mirror 5. After that, the light 203 is irradiated through an objective lens 6 onto a magneto-optic disk 7 attached to a disk rotating system 161 (spindle motor or the like). For example, as shown in FIG. 2, the magneto-optic disk 7 has a construction such that a recording surface 7b made of a magneto-optic recording medium is formed on a disk substrate 7a made of a transparent material such as polycarbonate or the like and the recording surface 7b is further covered by a protecting film 7c. The transmission light 203 which is irradiated onto the magneto-optic disk 7 is irradiated onto the recording surface 7b through the transparent disk substrate 7a.

An optical head of the embodiment is a separation type optical head (moving optical system) such that only the reflecting mirror 5, objective lens 6, a 2-dimensional actuator 159 to drive a position of the objective lens 6 to two axes in a focusing direction (Z axis in the diagram) and a tracking direction (Y axis in the diagram), and a carriage 160 to mount those component elements 5, 6, and 159 are made movable in the accessing direction (Y axis in the diagram) of the magneto-optic disk 7 from the inner peripheral position to the outer peripheral position by using an accessing system (mechanism system and control system; not shown), and the other optical parts and the like are fixed (hereinafter, the optical system is referred to as a fixed optical system).

A reflected light 206 from the magneto-optic disk 7 is reflected by the first reflecting surface 4a of the beam splitter 4 through the objective lens 6 and reflecting mirror 5 and is directed toward a second reflecting surface 4b.

Reflectances and transmittances of the second reflecting surface 4b of the beam splitter 4 are different with respect to the P polarized light and S polarized light, respectively. For example, the second reflecting surface 4b has polarization characteristics such that the transmittance. Tp of the P polarized light is (Tp ≈0.6), the reflectance Rp of the P polarized light is (Rp ≈0.4), the transmittance Ts of the S polarized light is (Ts ≈0), and the reflectance Rs of the S polarized light is (Rs ≈1). The reflected light 206 entering the second reflecting surface 4b is divided into two lights of a transmission light 207 and a reflected light 208.

The transmission light 207 transmitted through the second reflecting surface 4b of the beam splitter 4 is converged to a convergent light by detecting lens 29 through a diffraction grating 27. An astigmatism for detecting a focusing error is given by a cylindrical lens 40 (astigmatism generating unit). After that, the convergent light enters a photodetector 30. A detection of servo signals (focusing error signal and tracking error signal) using the photodetector 30 will now be described hereinbelow.

Figure 11:
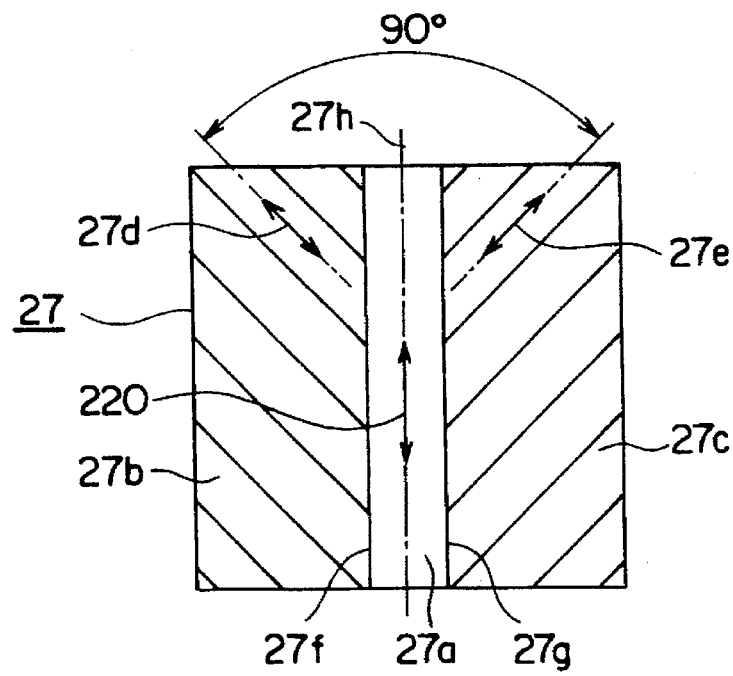
FIG. 11 is a front view showing an example of a 2-split diffraction grating which is used in the optical head in the embodiment.
Figure 12:
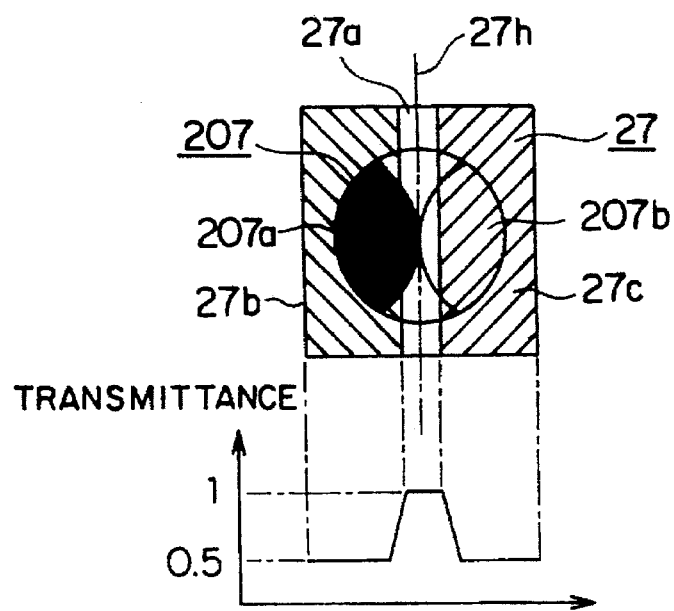
FIG. 12 is a conceptual diagram showing an example of a light using ratio (transmittance) of the 2-split diffraction grating.

The diffraction grating 27 will be first described with reference to FIGS. 11 and 12. FIG. 11 is a front view showing a construction of the diffraction grating 27. The diffraction grating 27 has: a belt-shaped flat region 27a having no grating; two grating regions 27b and 27c in which directions 27d and 27e of grating lines are different through the flat region 27a which is sandwiched therebetween (an angle between the directions 27d and 27e of the grating lines in the embodiment is equal to about 90°). Namely, two boundary lines 27f and 27g between the belt-shaped flat region 27a having no grating and the grating region 27b or grating region 27c are parallel and they are arranged so that a direction 220 of an image projected to the diffraction grating 27 of an information track (not shown) of the magneto-optic disk 7 coincides with a center 27h of those two boundary lines. As shown in FIG. 12, therefore, in a transmission light 207 which enters, the light in the center portion enters the belt-like flat region 27a having no grating, the light of an almost half circle including almost of a portion 207a in the information track of the disk substrate 7a (where the diffracted light having the zero-th order main light beam) and the diffracted light having an order of diffraction of +1 (sub light beam) interfere enters one grating region 27b, and the light of almost half circle including almost of a portion 207b in the information track of the disk substrate 7a where the diffracted light having the zero-th order (main light beam) and the diffracted light having an order of diffraction of −1 (sub light beam) interfere enters the other grating region 27c. The diffracted lights having orders of diffraction of +1 and −1 from the two grating regions 27b and 27c are respectively detected and their intensities are compared, so that a tracking error signal due to a push-pull method can be obtained. A focusing error signal due to an astigmatism method can be detected by using the light of the flat region 27a of the center portion of the diffraction grating and the diffracted lights having the zero-th order of the two grating regions 27b and 27c, namely, by using the direct transmission lights.

As shown in the diagram, a transmittance of the direct transmission light of the diffraction grating 27 is high in the center flat region 27a between the grating regions of the diffraction grating 27 (almost 1.0 in the embodiment) and those in the two grating regions 27b and 27c are low (almost 0.5 in the embodiment). Therefore, eventually, since the intensities of the direct transmission light in the portions 207a and 207b in the information track of the disk substrate 7a where the diffracted light having the zero-th order and the diffracted light having orders of diffraction of +1 and −1 interfere decrease, there is an advantage such that a mixture of a track traverse signal into the focusing error signal can be reduced. A detailed description of such an advantage is also omitted because it is not essentially related to the invention.

Figure 13:
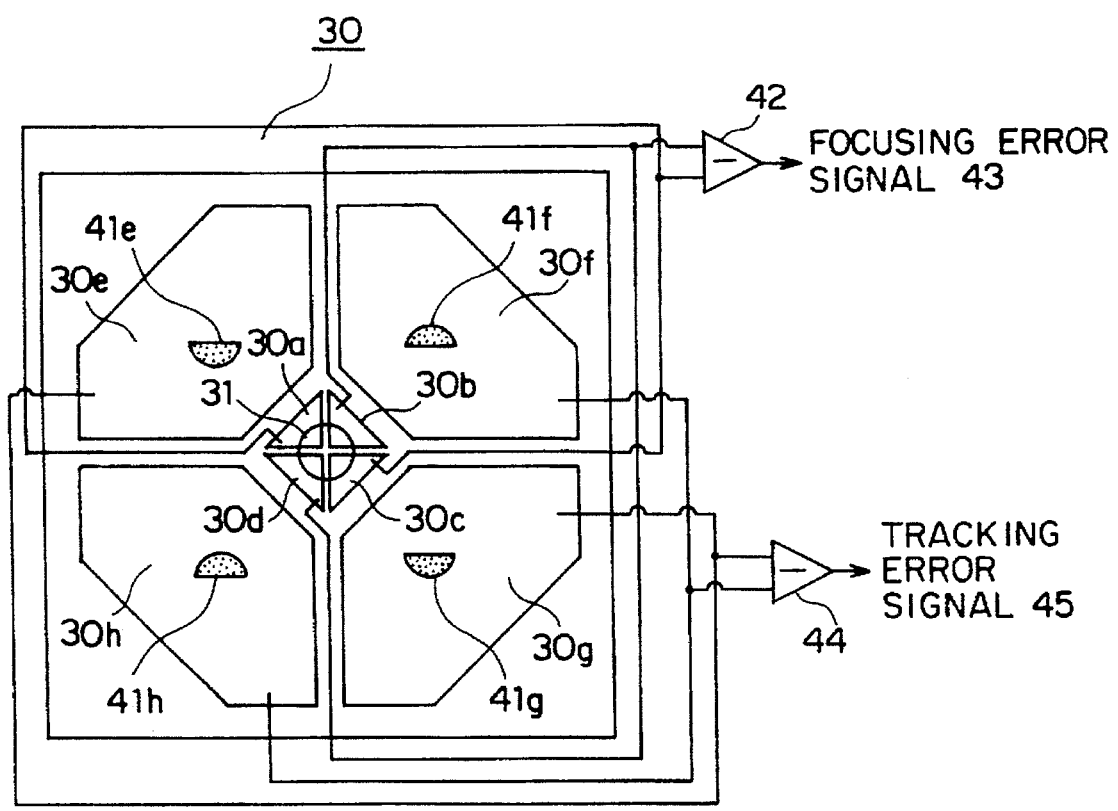
FIG. 13 is a front view showing an example of light receiving surfaces of photodetectors for a servo signal which is used in the optical head in the embodiment.

The photodetector 30 will now be described in detail with reference to FIG. 13. FIG. 13 is a front view showing the details of a construction of the photodetector 30 and also shows an arithmetic operating circuit to obtain each signal. The photodetector 30 has 4-split light receiving regions 30a to 30d at the center and also has independent light receiving regions 30e to 30h around them.

The light of the flat region 27a in the center portion of the diffraction grating 27 and the diffracted light having the zero-th order, namely, the direct transmission lights of the two grating regions 27b and 27c enter as a light spot 31 the 4-split light receiving regions 30a to 30d of the photodetector 30. Therefore, after photo currents from the light receiving regions 30a and 30c and photo currents from the light receiving regions 30b and 30d were converted into voltages by a current-voltage converter (not shown), the voltages are inputted to a subtracter 42 (differential amplifier), so that the focusing error signal due to the astigmatism method can be obtained.

The diffracted lights having orders of diffraction of +1 and −1 which were diffracted by the grating region 27b enter the light receiving regions 30f and 30h of the photodetector 30 as light spots 41f and 41h, respectively. The diffracted lights having the orders of diffraction of +1 and −1 which were diffracted by the grating region 27c enter the light receiving regions 30e and 30g of the photodetector 30 as light spots 41e and 41g, respectively. Therefore, after photo currents from the light receiving regions 30e and 30g and photo currents from the light receiving regions 30f and 30h were converted into voltages by a current-voltage converter (not shown), by inputting the voltages to a subtracter 44 (differential amplifier), the tracking error signal by the push-pull method can be obtained. The tracking error signal can be also obtained from a difference between incident light intensity signals of the light receiving regions 30h and 30g in this instance or a difference between incident light intensity signals of the light receiving regions 30e and 30f.

In FIG. 12, although almost semicircular shapes of images of the light spots 41e to 41h on the light receiving regions 30e to 30h are rotated by 90° for the shape on the diffraction grating 27, this is because an astigmatism has been given by the cylindrical lens 40. Since it is not the shape of image but the amount of light entering each region that is detected by each of the light receiving regions 30e to 30h, even if the shape of image changes, there will be no problem.

An information signal such as a bit signal or the like can be also obtained from the sum of the incident light intensity signals of the light receiving regions 30e to 30h, the sum of the incident light intensity signals of the light receiving regions 30e and 3f, the sum of the incident light intensity signals of the light receiving regions 30a to 30d, or further the sum of the incident light intensity signals of all of the light receiving regions 30a to 30h.

According to the optical head of the embodiment as described in detail above, the focusing error signal by the astigmatism method and the tracking error signal by the push-pull method can be detected in a lump by the optical system of one system.

In a detection optical system for detecting a magneto-optic signal from the reflected light 208 which was reflected by the second reflecting surface 4b of the beam splitter 4, a correction of a phase difference in the reflected light 208 as a reflected light from the disk occurring by the disk substrate 7a will now be described.

In FIG. 10, the reflected light 208 which was reflected by the second reflecting surface 4b of the beam splitter 4 is converged to a convergent light 209 by a lens 15. By transmitting through birefringence correcting unit 17, the convergent light 209 becomes a corrected light beam 210 in which a phase difference in the convergent light 209 occurring by the disk substrate 7a has been corrected.

Figure 14:
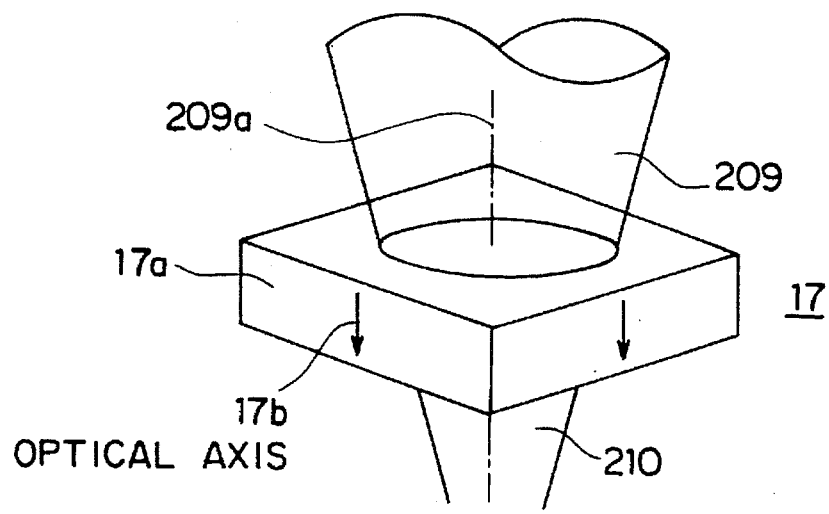
FIG. 14 is a perspective view showing an example of a construction of birefringence correcting unit of the optical head in the embodiment.

FIG. 14 shows the birefringence correcting unit 17 having an optical anisotropy arranged on an optical path of the convergent light 209 and corrected light beam 210 in the detection optical system in order to correct a fluctuation of the magneto-optic signal due to an influence by a dust or the like on the magneto-optic signal which occurs due to the optical anisotropy which the disk substrate has. The birefringence correcting unit 17 used in the optical head of the embodiment is constructed by a parallel flat plate 17a made of a positive uniaxial anisotropy crystal [for example, LiTaO$_3$, rutile (TiO$_2$)] as a positive uniaxial anisotropy medium.

A principle in which a polarized light distribution in the disk reflected light (convergent light 209) occurring by the disk substrate 7a is corrected by using the birefringence correcting unit 17 as a positive uniaxial anisotropy medium will now be described hereinbelow with reference to FIGS. 14, 15, and 16.

Figure 15:
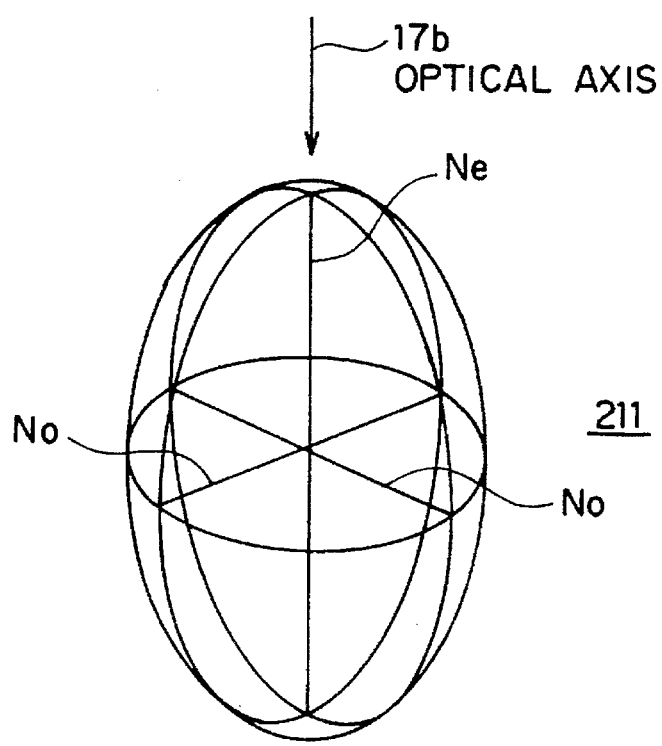
FIG. 15 is a conceptual diagram showing an example of a refractive index ellipsoid showing a birefringence of the birefringence correcting unit of the optical head in the embodiment.

FIG. 15 shows a refractive index ellipsoid 211 showing birefringence of the birefringence correcting unit 17. The refractive index ellipsoid 211 of the birefringence correcting unit 17 is a positive uniaxial anisotropy medium in which the direction of an optic axis 17b is set to the direction of a thickness of parallel flat plate 17a and the refractive index Ne of the extraordinary light is larger than the refractive index No of the ordinary light. The optic axis 17b is parallel with an optic axis 209a of the convergent light 209.

Figure 16:
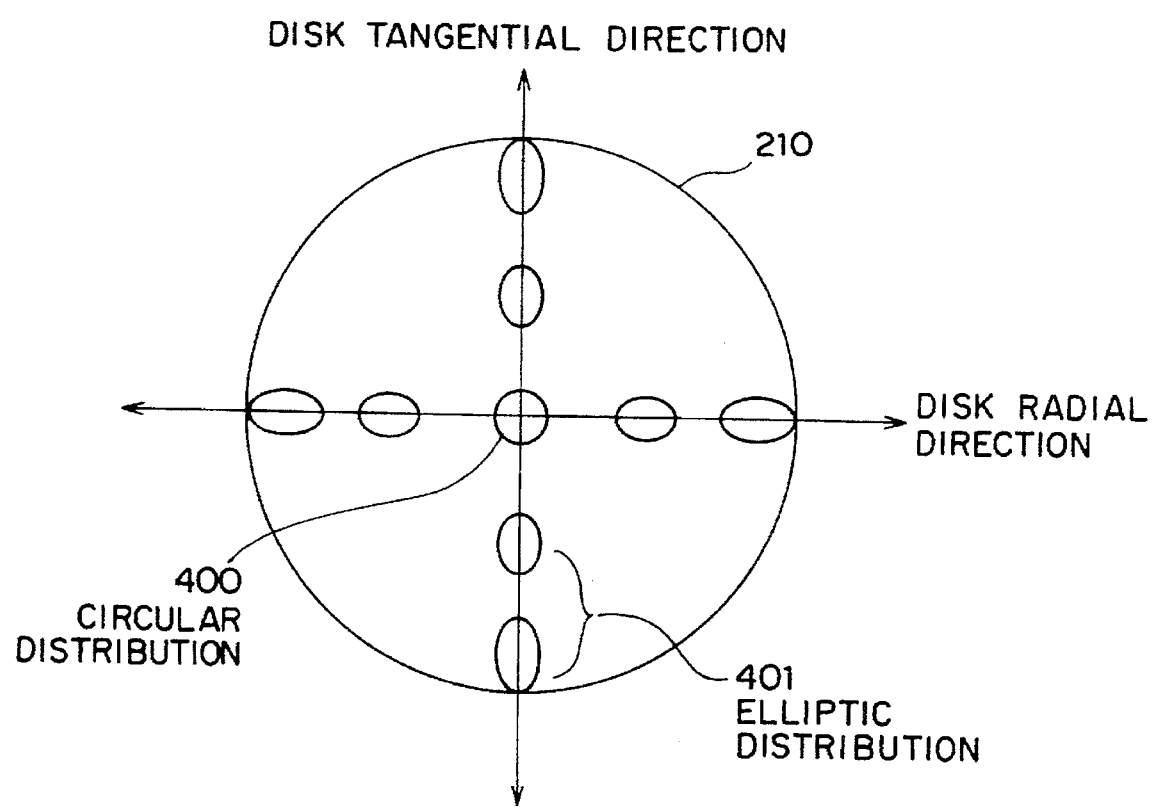
FIG. 16 is a conceptual diagram showing an example in a light beam of a refractive index difference which is given to the light beam transmitted through the birefringence correcting unit of the optical head in the embodiment.

FIG. 16 schematically shows a refractive index in the direction of the incident light at an arbitrary position in the corrected light beam 210 which was transmitted through the birefringence correcting unit 17 in FIG. 14. In the diagram, since the center light beam (optic axis 209a) is an incident light beam from the direction of the optic axis 17b of the birefringence correcting unit 17 as a positive uniaxial anisotropy medium, the refractive index shows a circular distribution 400. Since the other light beams become incident light beams in the directions other than the direction of the optic axis 17b of the birefringence correcting unit 17 as a positive uniaxial anisotropy medium, the refractive index shows an elliptic distribution 401. The light at the outer periphery of the light beam progresses in the birefringence correcting unit 17 as a positive uniaxial anisotropy medium at a larger inclination for the optic axis 17b as the light position approaches the outer periphery of the light beam, so that an elliptic ratio (ratio of the major axis and the minor axis) of an ellipse increases. Namely, the minor axis of the ellipse shows the refractive index No of the birefringence correcting unit 17 as a positive uniaxial anisotropy medium shown in FIG. 15 and the major axis of the ellipse of the light at the outer periphery increases from the refractive index Ne in accordance with the outer peripheral position.

Figure 5:
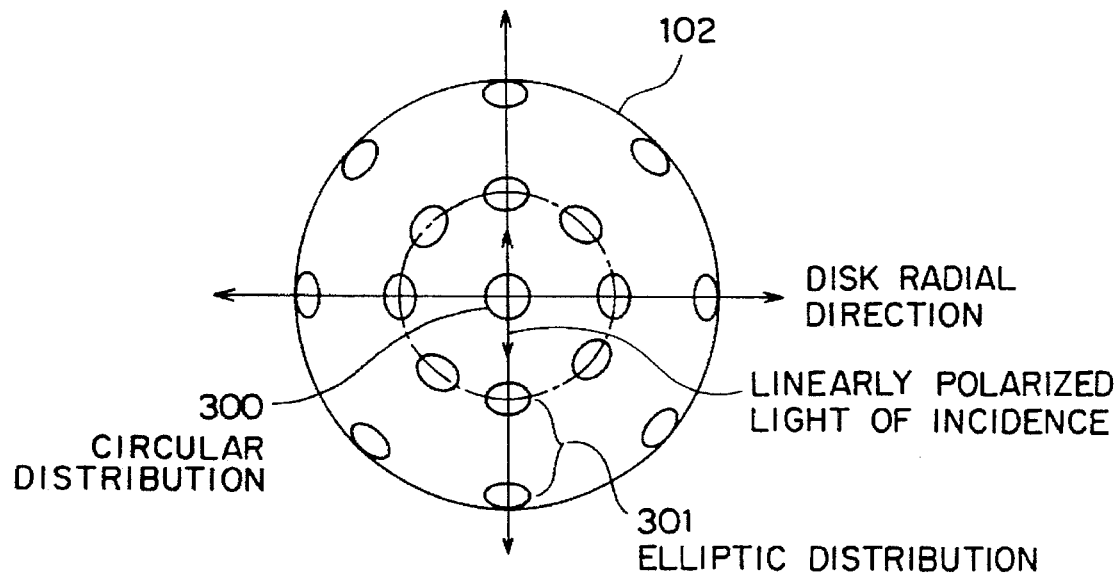
FIG. 5 is a conceptual diagram showing an example of a distribution in a light beam of a difference between refractive indices which is given to the light beam reflected by a magneto-optic disk having a birefringence.
Figure 6:
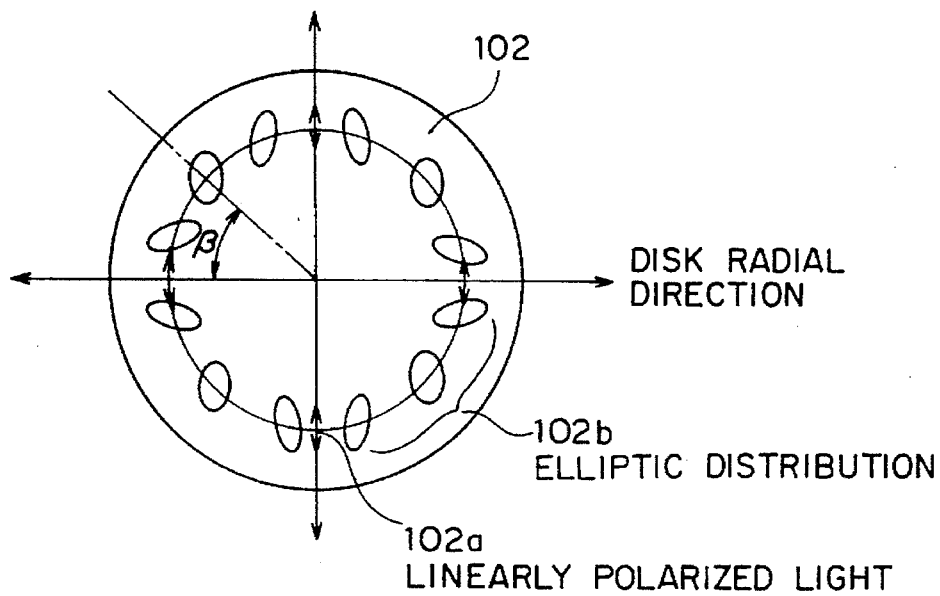
FIG. 6 is a diagram showing a distribution of a polarization state in the light beam reflected by the magneto-optic disk having a birefringence.

When comparing the distribution of the refractive index in the corrected light beam 210 with the distribution of the refractive index (FIG. 5) in the reflected light beam 102 which was transmitted through the disk substrate 7a, the directions of the ellipse (elliptic distribution 401 in FIG. 16; elliptic distribution 301 in FIG. 5) of the refractive indices of the lights at the same position in the light beams perpendicularly cross. Namely, although the direction of the major axis of the elliptic distribution 401 in the corrected light beam 210 which was transmitted through the birefringence correcting unit 17 is set to the tangential direction of the disk, the direction of the major axis of the elliptic distribution 301 in the reflected light beam 102 which was transmitted through the disk substrate 7a is set to the radial direction of the disk. Therefore, a phase difference (FIG. 6) which is given to the reflected light beam 102 by transmitting through the disk substrate 7a and a phase difference which is given by transmitting through the birefringence correcting unit 17 have opposite phases. The phase difference of the reflected light beam 102, consequently, is corrected when the reflected light beam 102 is transmitted through the birefringence correcting unit 17.

As described above, the phase distribution in the reflected light occurring in the disk substrate having a birefringence can be corrected by transmitting through the birefringence correcting unit 17 provided on the convergent optical path in the detection optical system.

A thickness t of the birefringence correcting unit 17 is given from an optical constant of the optical head, a birefringence constant of the disk substrate 7a, and a focal length of the lens 15 in the detection optical system. Namely, in the case where the above constants in the embodiment are set to the following values, the thickness t of the birefringence correcting unit 17 is equal to 6 mm.

Laser wave length of the semiconductor laser 1=685 nm

Numerical aperture of the objective lens 6=0.55

Focal length of the objective lens 6=3 mm

Birefringence (FIG. 4) of the disk substrate 7a=Ne–No= –0.00035

Thickness of the disk substrate 7a=1.2 mm

Focal length of the lens 15=12 mm

Birefringence of the birefringence correcting unit 17 (LiTaO₃)=Ne–No=0.0044

The corrected light beam 210 in which the polarized light distribution occurring in the disk substrate 7a was corrected by the birefringence correcting unit 17 enters a polarization beam splitter 16. The polarization beam splitter 16 is an analyzer for separating the incident light beam into two polarized light beams whose polarizing directions perpendicularly cross and is rotated by 45° around the optic axis of incidence. The polarization beam splitter 16 polarizes and separates the incident corrected light beam 210 into two light beams whose planes of polarization perpendicularly cross, namely, into a P polarized light 210p (transmission light; not shown) and an S polarized light 210s (reflected light; not shown). The lights 210p and 210s enter photodetectors 51 and 52, respectively. A magneto-optic signal is detected from the photodetectors 51 and 52.

As mentioned above, before entering the polarization beam splitter 16, since the polarized light distribution of the corrected light beam 210 occurring in the disk substrate 7a has been corrected by the birefringence correcting unit 17, the distribution of the light amount in the cross sectional plane of the corrected light beam 210 is almost uniform around the optic axis. Therefore, even in the case where a shadow occurs in the corrected light beam 210 because a dust, a fouling, or the like exists at the reading position of the magneto-optic disk 7, the reduced amounts of the light amounts due to the shadow in both of the photodetectors 51 and 52 are equal. In the differential detection to obtain a difference between both of the detection signals, for example, the occurrence of an S-shaped fluctuation of a DC level of the detection signal as shown in an example of FIG. 3 is avoided and accurate information can be reproduced.

Figure 3:
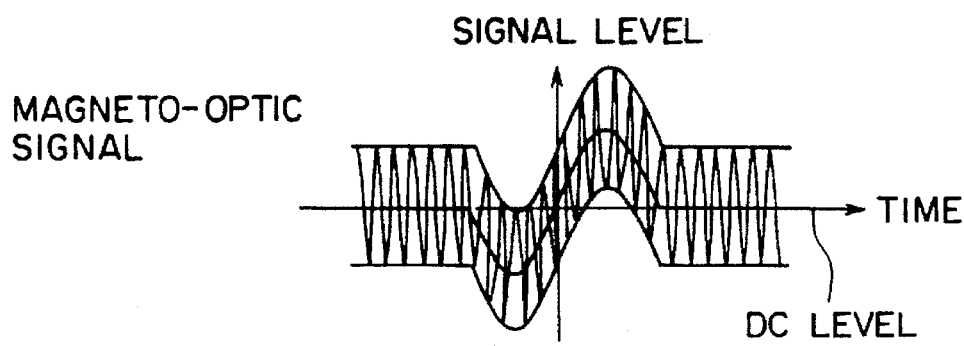
FIG. 3 is a waveform diagram showing an example of a fluctuation of a magneto-optic signal due to a dust on the surface of the magneto-optic disk.

Since the noises due to a foreign matter such as dust, fouling, or the like on the magneto-optic disk 7 have physically been eliminated by the arrangement of the birefringence correcting unit 17, it is also unnecessary that a software for controlling a signal processing system (not shown) for processing the outputs of the photodetectors 51 and 52 is made complicated than it is needed in order to prevent the occurrence of the S-shaped fluctuation of the DC level of the detection signal as shown in the example of FIG. 3.

Since the influence by the foreign matter such as dust, fouling, or the like which is deposited onto the magneto-optic disk 7 can be eliminated, even under a relatively inferior environment with a large quantity of dust or the like, the normal operation can be performed and an operability and a market value of the magneto-optic disk apparatus are improved.

Another example of a construction of the birefringence correcting unit which is provided for the detection optical system will now be described. FIG. 17 is a perspective view of birefringence correcting unit 77 constructed by using a quartz as a positive uniaxial anisotropy crystal as birefringence correcting unit. Although a quartz is a positive uniaxial anisotropy crystal which is optically stable, it has a nature such that the plane of polarization rotates when the light transmits, namely, a rotatory polarization. In order to correct the rotatory polarization, therefore, the birefringence correcting unit 77 of the embodiment has a construction such that a parallel flat plate 77a which is made of quartz having a right rotatory polarization and whose optic axis 77b is perpendicular to an incident surface 77e and a parallel flat plate 77c which is made of quartz having a left rotatory polarization and whose optic axis 77d is perpendicular to an incident surface 77f are adhered. The birefringence correcting unit 77 is provided in a convergent optical path so that the optic axis 77b (optic axis 77d) is parallel with the optic axis 209a of the convergent light 209 which enters. Thus, the corrected light beam 210 in which the phase difference that is given by the disk substrate 7a was corrected can be obtained without rotationally polarizing the convergent light 209 which comes. A plate thickness (t1, t2) of the birefringence correcting unit 77 is given by the constants of the optical head and disk substrate 7a in the embodiment. Assuming that the respective constants in the embodiment have the following values, the plate thickness (t1, t2) of the birefringence correcting unit 77 of the embodiment is equal to 2 mm.

Laser wave length of the semiconductor laser 1=685 nm

Numerical aperture of the objective lens 6=0.55

Focal length of the objective lens 6=3 mm

Birefringence (FIG. 17) of the disk substrate 7a=Ne-No= -0.00035

Thickness of the disk substrate 7a=1.2 mm

Focal length of the lens 15=19 mm

Birefringence of the birefringence correcting unit 77 (quartz)=Ne-No=-0.009

In the above description, there has been shown the example in which in the case where the refractive index ellipsoid showing the birefringence of the disk substrate 7a is the negative uniaxial anisotropy medium, the positive uniaxial anisotropy medium is used as birefringence correcting unit for the correction. However, the invention is not limited to such an example.

Figure 4:
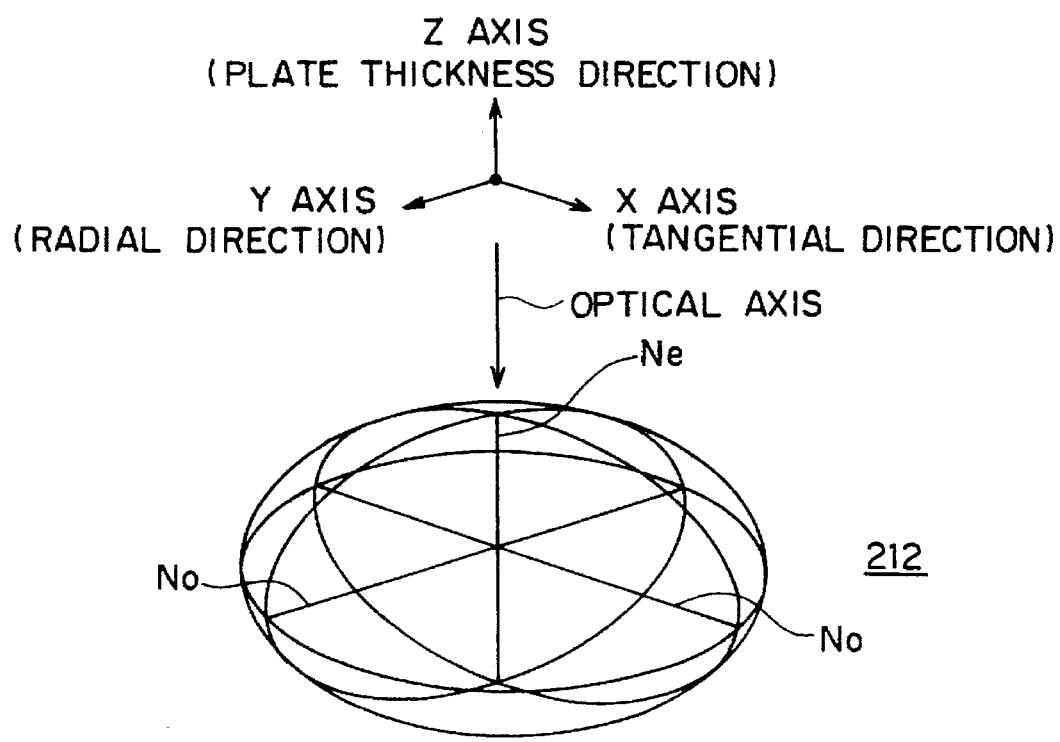
FIG. 4 is a conceptual diagram of a refractive index ellipsoid showing an example of a birefringence of a substrate of the magneto-optic disk.
Figure 19:
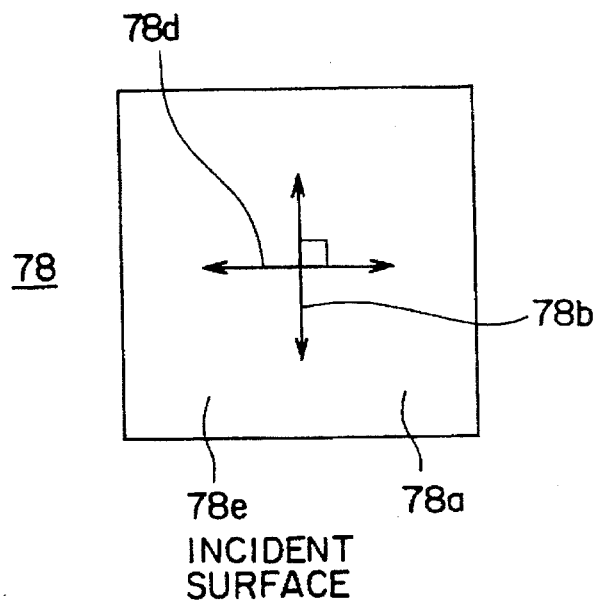
FIG. 19 is a conceptual diagram showing an example of a relation among optical axes of a plurality of parallel flat plates constructing the birefringence correcting unit shown as an example in FIG. 18.

An embodiment using a negative uniaxial anisotropy medium as birefringence correcting unit for correcting the birefringence (negative uniaxial anisotropy medium; FIG. 4) of the disk substrate 7a will now be described hereinbelow. FIG. 18 is a perspective view of birefringence correcting unit 78 constructed by a negative uniaxial anisotropy crystal (for example, LiNbO$_3$) as a negative uniaxial anisotropy medium as birefringence correcting unit. The birefringence correcting unit 78 of the embodiment has a construction such that a parallel flat plate 78a whose optic axis 78b is parallel with the incident surface and a parallel flat plate 78c whose optic axis 78d is parallel with the incident surface are adhered in a manner such that the optical axes 78b and 78d perpendicularly cross as shown in FIG. 19. The birefringence correcting unit 78 is provided in the optical path of the convergent light 209 in a manner such that the optic axis 78b (optic axis 78d) perpendicularly crosses the incident optic axis.

Figure 20:
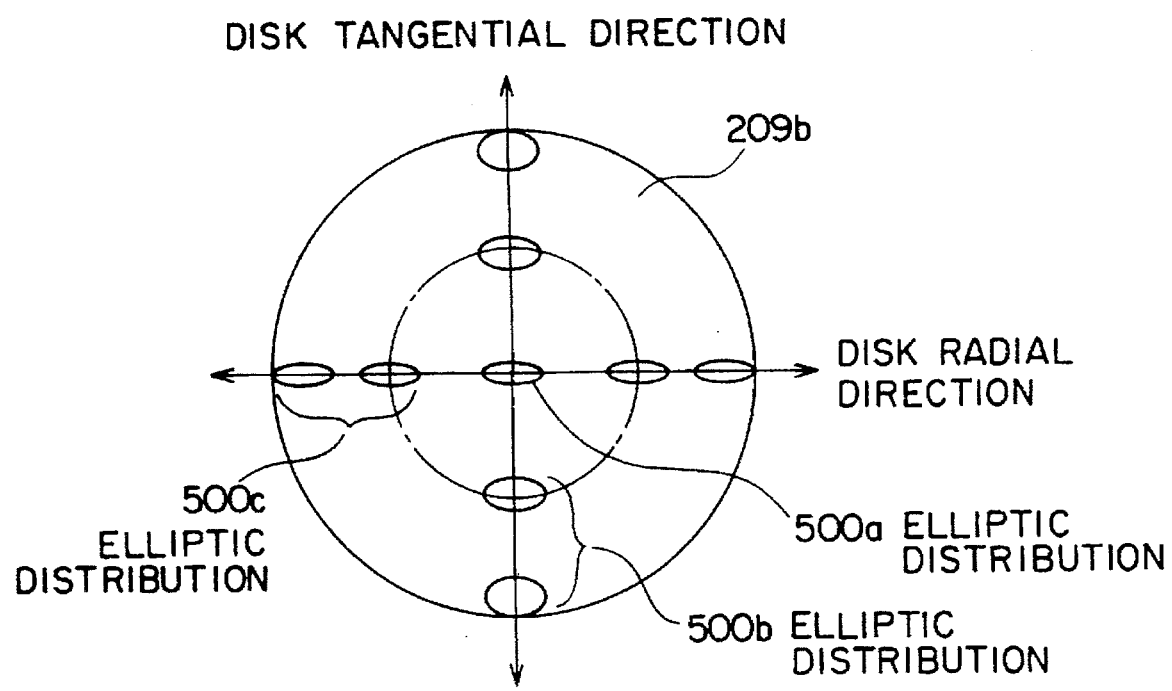
FIG. 20 is a conceptual diagram showing an example of a distribution in a light beam of a difference among refractive indices which is given to the light beam transmitted through the first parallel flat plate constructing the birefringence correcting unit shown as an example in FIG. 19.
Figure 21:
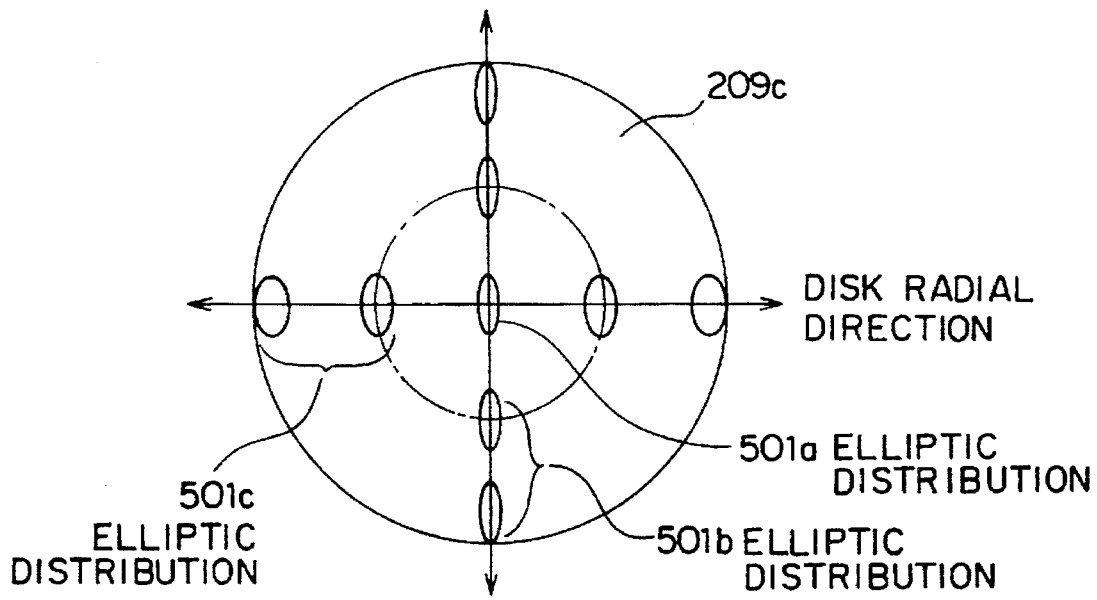
FIG. 21 is a conceptual diagram showing an example of a distribution in a light beam of a difference among refractive indices which is given to the light beam transmitted through the second parallel flat plate constructing the birefringence correcting unit shown as an example in FIG. 19.

A principle in which a deviation of the polarized light distribution around the optic axis of the reflected light 206 (convergent light 209) which is caused due to the birefringence of the disk substrate 7a is corrected will now be described with reference to FIGS. 20 and 21. FIG. 20 schematically shows a refractive index (ellipse showing a distribution of the refractive index for the incident direction of the light) which is given to a light beam 209b which was transmitted through the parallel flat plate 78a of the birefringence correcting unit 78. FIG. 21 schematically shows a distribution of a refractive index (ellipse showing a distribution of the refractive index for the incident direction of the light) which is given to a light beam 209c which was transmitted through the parallel flat plate 78c of the birefringence correcting unit 78. From FIG. 20, in the diagram, the parallel flat plate 78a as a negative uniaxial anisotropy medium is arranged so that the optic axis 78b is perpendicular (coincides with the tangential direction of the disk in the embodiment) to the optic axis 209a of the convergent light 209 which enters. Therefore, the center light beam (optic axis 209a) becomes an elliptic distribution 500a which gives the maximum refractive index difference (=No-Ne). As for an elliptic distribution 500b showing a refractive index for the other light beam, for example, in the diagram, the incident light beam from the direction (disk tangential direction in the diagram) including the optic axis 78b, a refractive index in the direction of the minor axis (direction of the optic axis 78b) of the elliptic distribution 500a is large. On the other hand, an elliptic distribution 500c indicative of a refractive index for the incident light beam from the direction (disk radial direction in the diagram) perpendicular to the optic axis 78b is constant (coincides with the elliptic distribution 500a) irrespective of the incident angle.

On the other hand, from FIG. 21, in the diagram, the parallel flat plate 78c as a negative uniaxial anisotropy medium is arranged so that the optic axis 78d is perpendicular (coincides with the disk radial direction in the embodiment) to the optic axis 209a of the convergent light 209 which enters. Therefore, the center light beam (optic axis 209a) becomes an elliptic distribution 501a which gives the maximum refractive index difference (=No-Ne). An elliptic distribution 501b showing a refractive index for the other light beam, for example, the incident light beam from the direction (disk tangential direction in the diagram) perpendicular to the optic axis 78d is constant (coincides with the elliptic distribution 501a) irrespective of the incident angle. On the other hand, in the diagram, as for the elliptic distribution 501c showing a refractive index for the incident light beam from the direction (disk radial direction in the diagram) including the optic axis 78d, the refractive index in the minor axis direction (direction of the optic axis 78d) of the elliptic distribution 501a increases.

Therefore, a refractive index (ellipse showing a distribution of the refractive index for the incident direction of the light) which is given to the corrected light beam 210 which was transmitted through the parallel flat plates 78a and 78c is equal to the value obtained by adding the refractive index (FIG. 20) which is given to the light beam transmitted through the parallel flat plate 78a and the refractive index (FIG. 21) which is given to the light beam transmitted through the parallel flat plate 78c. The resultant refractive index distribution is the same as the distribution shown in FIG. 16 as a distribution that is necessary when correcting the refractive index distribution which is given by the disk substrate 7a. Namely, the same refractive index distribution as that in case of the foregoing birefringence correcting unit 17 and 77 constructed by using the positive uniaxial anisotropy medium is given into the transmission light beam. The phase difference which is given by transmitting through the birefringence correcting unit 78 has an opposite phase. Thus, the distribution of the phase difference (polarized light) of the convergent light 209 given by the disk substrate 7a is corrected when the convergent light 209 is transmitted through the birefringence correcting unit 78. The plate thickness (t1, t2) of the birefringence correcting unit 78 is given by the constants of the optical head and disk of the embodiment. Now, assuming that the constants have the following values in the embodiment, the plate thickness (t1, t2) of the birefringence correcting unit 78 in the embodiment is equal to 0.9 mm.

Laser wavelength of the semiconductor laser 1=685 nm

Numerical aperture of the objective lens 6=0.55

Focal length of the objective lens 6=3 mm

Birefringence (FIG. 4) of the disk substrate 7a=Ne−No= −0.00035

Thickness of the disk substrate 7a=1.2 mm

Focal length of the lens 15=19 mm

Birefringence of the birefringence correcting unit 78 ($LiNbO_3$)=Me−No=0.082

In the birefringence correcting unit 78 of the embodiment, although it has a construction such that the parallel flat plates 78a and 78c are adhered in a manner such that the optic axis 78b of the parallel flat plate 78a is set to the disk tangential direction and the optic axis 78d of the parallel flat plate 78c is set to the disk radial direction, the invention is not limited to such an example. It is sufficient to use a construction such that the parallel flat plates 78a and 78c are arranged so that the optical axes 78b and 78d perpendicularly cross or a construction such that they are separately arranged. In the embodiment, by equalizing the thickness t1 of the parallel flat plate 78a with the thickness t2 of the parallel flat plate 78c, no phase difference is caused for the light beam (center of the light beam) which enters perpendicularly to the disk substrate. However, in the case where the refractive index ellipsoid showing the birefringence of the disk substrate needs to be handled as a biaxial anisotropy medium, the case where a predetermined phase difference occurs in another optical part (for example, beam splitter 4 in FIG. 10) of the optical head, or the like, it is also possible to construct so as not to make t1 and t2 coincide in order to correct the predetermined phase difference. In this case, the predetermined phase difference is given by the maximum refractive index difference (=Ne−No) and a plate thickness difference (t1−t2).

Embodiment 2

Figure 22:
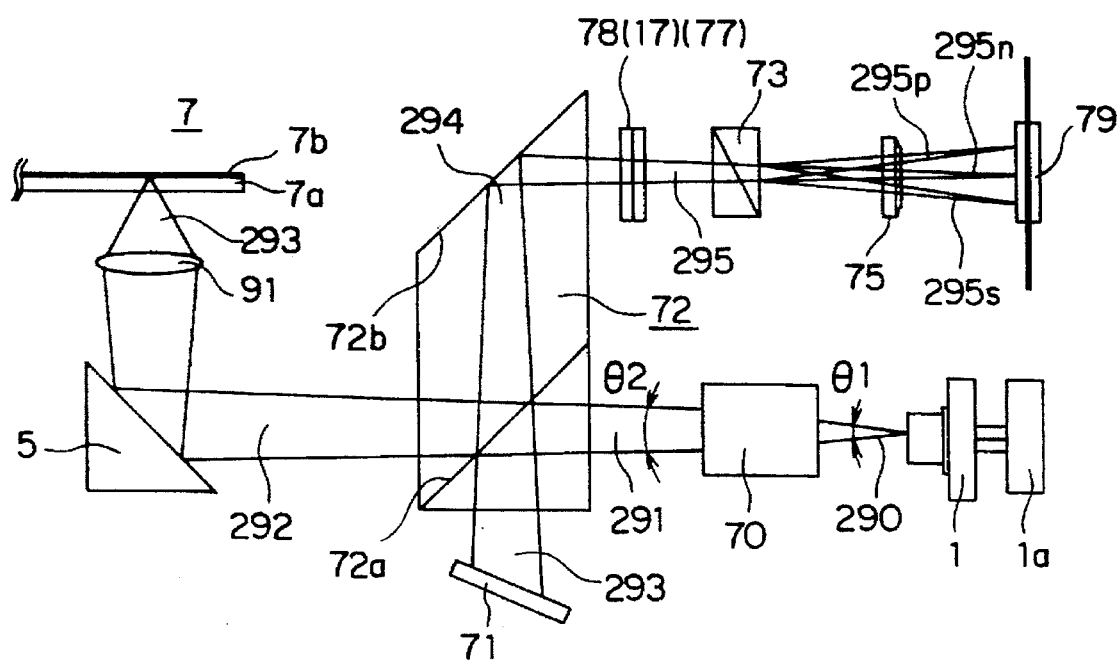
FIG. 22 is a schematic constructional diagram showing an example of an optical head in a magneto-optic disk apparatus according to another embodiment of the invention.

A magneto-optic disk apparatus according to another embodiment of the invention will now be described with reference to the drawings. FIG. 22 is a conceptual diagram showing an example of a construction of an optical head provided for the magneto-optic disk apparatus according to another embodiment.

In FIG. 22, a divergent light beam 290 diverged from the semiconductor laser 1 as a light source (with a high frequency multiplexing circuit 1a to reduce the noises of the semiconductor laser 1 occurring by the return light or the like) is converted into a divergent light beam 291 in which a divergent angle 81 of the semiconductor laser 1 was reduced to a divergent angle 82 by a lens 70. The divergent light beam 291 enters a reflecting surface 72a of a beam splitter 72. Reflectances and transmittances of the reflecting surface 72a of the beam splitter 72 differ with respect to the P polarized light and the S polarized light, respectively. For example, the reflecting surface 72a has polarization characteristics such that the transmittance Tp of the P polarized light is (Tp≈0.75), the reflectance Rp of the P polarized light is (Rp≈0.25), the transmittance Ts of the S polarized light is (Ts≈0), and the reflectance Rs of the S polarized light is (Rs≈1). The divergent light beam 291 (P polarized light) which enters the reflecting surface 72a is divided into a transmission light 292 and a reflected light 293.

In the two lights, the reflected light 293 enters a photodetector 71. The photodetector 71 is arranged obliquely for the reflected light 293 as a countermeasure for a stray light (countermeasure for preventing that the unnecessary light that is reflected at the incident surface, namely, the stray light enters the semiconductor laser and the other photodetector). A light intensity of the divergent light beam 290 which is emitted from the semiconductor laser 1 is controlled by using the photodetector 71. Explanation of such a light intensity control is omitted here since it is not essentially related to the present invention.

On the other hand, a progressing direction of the transmission light 292 transmitted through the reflecting surface 72a of the first beam splitter 72 is changed by the reflecting mirror 5. After that, the transmission light 292 is irradiated onto the recording surface 7b through the disk substrate 7a of the magneto-optic disk 7 attached to a disk rotating system (spindle motor etc.; not shown) by an objective lens 91 as a lens of a finite system.

A reflected light 293 (divergent light) from the magneto-optic disk 7 is converted into a convergent light 294 by the objective lens 91. The convergent light 294 is reflected by the reflecting surface 72a of the beam splitter 72 through the reflecting mirror 5 and is further reflected by a total reflecting surface 72b and goes out of the beam splitter 72. The reflected light 293 is transmitted through the birefringence correcting unit 78, so that it becomes a light beam 295 in which a phase difference in the convergent light 294 occurring by the disk substrate 7a was corrected. The birefringence correcting unit 78 which is used in the optical head of the embodiment uses the negative uniaxial anisotropy crystal (for example, $LiNbO_3$) described in FIG. 18. The light beam 295 whose phase difference was corrected enters an analyzer 73 (for example, constructed by a birefringence medium), by which the incident light beam is separated into three light beams comprising two polarized light beams (P polarized light 295p, S polarized light 295s) whose polarizing directions perpendicularly cross and a light beam 295n whose P polarized light component and S polarized light component were synthesized. After an astigmatism for detection of a focusing error was given to those light beams by a cylindrical lens 75, the light beams enter a photodetector 79, respectively.

Figure 23:
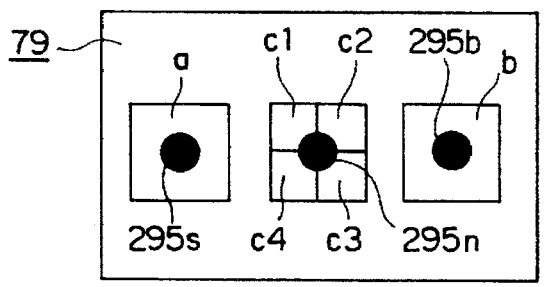
FIG. 23 is a conceptual diagram showing an example of a light receiving surface of a photodetector to detect a magneto-optic signal which is used in the optical head in the magneto-optic disk apparatus according to another embodiment of the invention.

FIG. 23 shows the S polarized light 295s and P polarized light 295p which entered the light receiving regions a, b, and c1 to c4 of the photodetector 79 which is used in the optical head of the embodiment and the light beam 295n in which the P polarized light component and the S polarized light component were synthesized. The magneto-optic signal is derived by performing a subtraction between outputs of the light receiving regions a and b. On the other hand, a focusing error signal is obtained from the light receiving regions c1 to c4 into which the light beam 295n entered by an arithmetic operation [(c1+c3)−(c2+c4)] based on the astigmatism method.

According to the above construction of the optical head of the embodiment, the divergent light beam 290 emitted from the semiconductor laser 1 is transmitted through the reflecting surface 72a of the beam splitter 72. However, the polarization characteristics of the reflecting surface 72a can be also set such that, for example, the transmittance Tp of the P polarized light is (Tp≈1), the reflectance Rp of the P polarized light is (Rp≈0), the transmittance Ts of the S polarized light is (Ts≈0.2), and the reflectance Rs of the S polarized light is (Rs≈0.8), and it is also possible to construct such that the divergent light beam 290 emitted from the semiconductor laser 1 is reflected by the total reflecting surface 72b and reflecting surface 72a.

As described above, according to each of the above embodiments of the invention, the phase difference distribution in the reflected light beam due to the birefringence of the disk substrate 7a can be corrected. Therefore, a good magneto-optic signal can be obtained without causing a fluctuation of the magneto-optic signal which occurs due to the phase difference distribution and the light shielding of the reflected light by a foreign matter such as dust, fouling, or the like on the magneto-optic disk 7 as causes.

In the design (thickness of the medium and the like) of the birefringence correcting unit of the above embodiment described in detail, although the birefringence of the transparent disk substrate has been perfectly corrected, the invention is not limited to such an example. Namely, a substrate (glass or the like) with less birefringence can be also used as a transparent substrate of the magneto-optic disk. Therefore, in the magneto-optic disk apparatus which needs to record and reproduce magneto-optic disks manufactured by using various transparent substrates, it is also possible to construct so as to correct a proper amount (for example, half) of the birefringence of the disk substrate having the large birefringence in consideration of a compatibility of the medium or the like.

According to the magneto-optic disk apparatus of the invention, in the case where the magneto-optic disk using a substance having a birefringence as a transparent substrate is used as a recording medium, an effect such that the recording information can be accurately read out without being influenced by the deposition of a foreign matter such as dust, fouling, or the like onto the magneto-optic disk is obtained.

According to the magneto-optic disk apparatus of the invention, in the case where the magneto-optic disk using a substance having a birefringence as a transparent substrate is used as a recording medium, an effect such that the noises due to a foreign matter such as dust, fouling, or the like deposited on the magneto-optic disk are eliminated and the recording information can be accurately read out without making a software for processing the read signal complicated is obtained.

Figure 24:
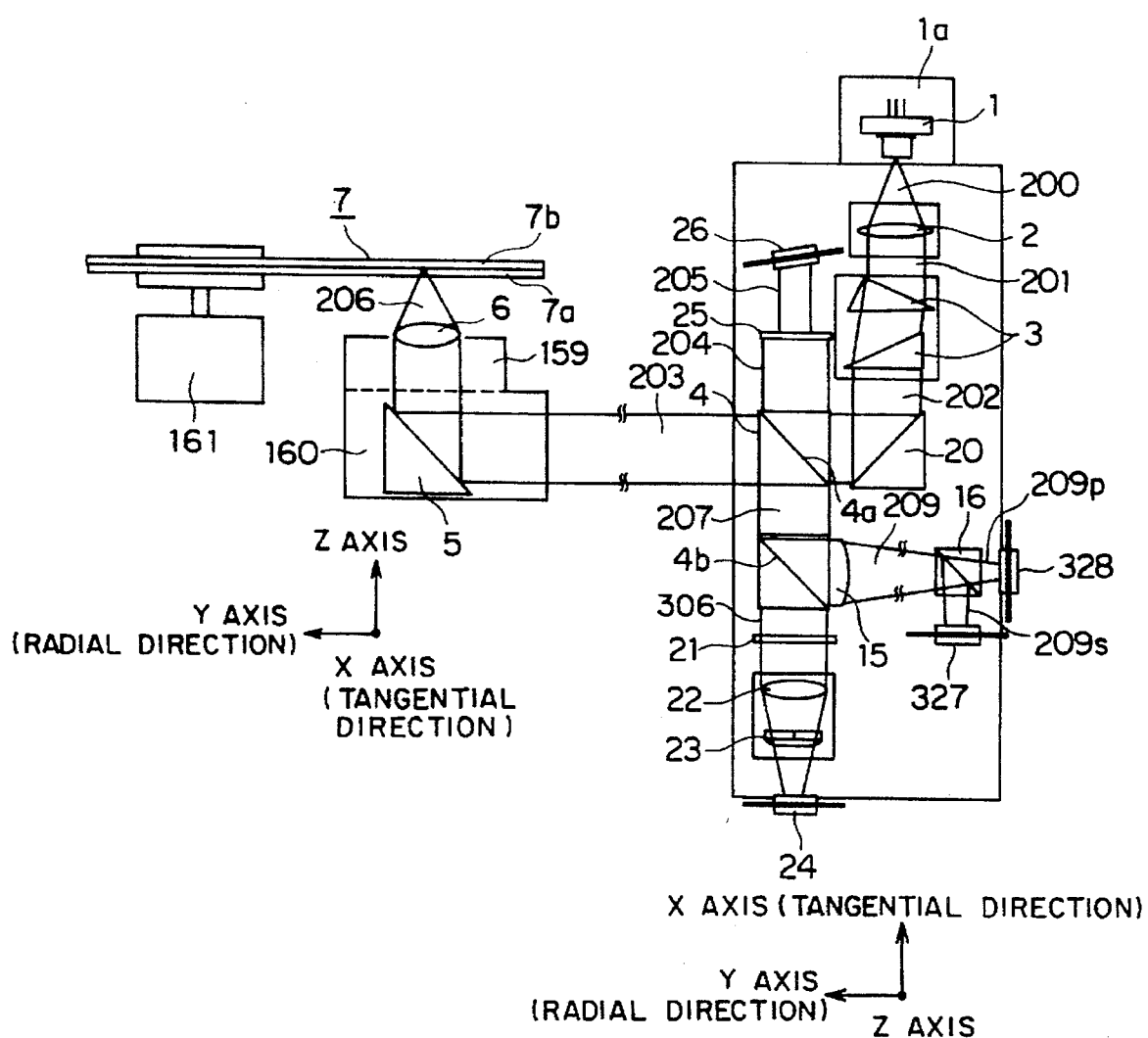
FIG. 24 is a schematic constructional diagram showing an example of the optical head in the magneto-optic disk apparatus according to another embodiment of the invention.

FIG. 24 is a constructional diagram showing an optical head portion of the third embodimemt of a magneto-optic disk apparatus according to the invention. Reference numeral 1a denotes the high frequency multiplexing circuit; 4a and 4b the reflecting surfaces; 20 a reflecting mirror; 21 a diffraction grating; 22 a detecting lens; 23 a cylindrical lens; 24 a photodetector; 25 a light shielding member; 26 a photodetector; 327 and 328 photodetectors; 159 the 2-dimensional actuator; 160 the carriage; and 161 the disk rotating system. The portions corresponding to those in FIG. 23 are designated by the same reference numerals.

In FIG. 24, the light beam 200 emitted from the semiconductor laser 1 as a light source is converted into the parallel light beam 201 by the collimator lens 2. An anisotropy of an intensity of the laser beam is corrected by the beam shaping prism 3 and the parallel light beam 201 is converted into the isotropic parallel light beam 202. The high frequency multiplexing circuit 1a is added to the semiconductor laser 1 in order to reduce the noises.

An optical path of the parallel light beam 202 which is emitted from the beam shaping prism 3 is deflected by 90° by the reflecting mirror 20. The deflected light beam enters the reflecting surface 4a of the beam splitter 4. Reflectances and transmittances of the reflecting surface 4a are different with respect to the P polarized light and the S polarized light. For example, the reflecting surface 4a has the polarization characteristics such that the transmittance Tp of the P polarized light is (Tp≈0.7), the reflectance Rp of the P polarized light is (Rp≈0.3), the transmittance Ts of the S polarized light is (Ts≈0), and the reflectance Rs of the S polarized light is (Rs≈1). The light beam 202 entering the reflecting surface 4a is the P polarized light and is divided into two lights of the transmission light 203 of the P polarized light and the reflected light 204.

The reflected light 204 enters the light shielding member 25 having a limiting aperture (assuming a circular limiting aperture here) and is transmitted to its limiting aperture and enters the photodetector 26 as a light beam 205. The photodetector 26 is arranged obliquely for the light beam 205 as a countermeasure for the stray light (countermeasure to prevent that the unnecessary light which is reflected by the incident surface, namely, the stray light enters the semiconductor laser or other photodetectors).

The light shielding member 25 is not always necessary but the light beam 204 can be also allowed to directly enter the photodetector 26 or a lens can be also used.

Although the semiconductor laser 1 has been controlled in accordance with the output of the photodetector 26 to thereby keep the light intensity of the light beam 200 which is emitted from the semiconductor laser 1 constant, its detailed description is omitted because it is not essentially related to the invention.

After the progressing direction of the transmission light beam 203 of the reflecting surface 4a of the beam splitter 4 was changed by the reflecting mirror 5, the light beam is irradiated onto the magneto-optic disk 7 by the objective lens 6. The magneto-optic disk 7 is attached to the disk rotating system 161 such as a spindle or the like and is rotated.

In the embodiment, the optical head which is used is the moving optical system such that only the reflecting mirror 5, objective lens 6, 2-dimensional actuator 159 to biaxially drive the objective lens in the focusing direction (direction of a Z axis) and in the track direction (direction of a Y axis), and carriage 160 on which the above component elements 5, 6, and 159 are mounted are conveyed in the accessing direction (direction of the Y axis) of the magneto-optic disk 7 from the inner peripheral position to the outer peripheral position and by using an accessing system (mechanism system and control system; not shown) the other optical parts and the like are fixed (hereinafter, such an optical system is referred to as a fixed optical system).

The reflected light 206 from the magneto-optic disk 7 is reflected by the reflecting surface 4a of the beam splitter 4 through the objective lens 6 and reflecting mirror 5 and is directed toward the reflecting surface 4b as a light beam 207. Reflectances and transmittances of the reflecting surface 4b are different with respect to the P polarized light and the S polarized light, respectively. For example, the. reflecting surface 4b has polarization characteristics such that the transmittance Tp of the P polarized light is (Tp≈0.6), the reflectance Rp of the P polarized light is (Rp≈0.4), the transmittance Ts of the S polarized light is (Ts≈0), and the reflectance Rs of the S polarized light is (Rs≈1). Thus, the light beam 206 which entered the reflecting surface 4b is divided into two lights of a transmission light 360 and a reflected light 209.

The light beam 360 transmitted through the reflecting surface 4b of the beam splitter 4 is converted into the convergent light by the detecting lens 22 through the diffraction grating 21. An astigmatism for detection of a focusing error is given to the convergent light by the cylindrical lens 23 as astigmatism generating unit. After that, the convergent light enters the photodetector 24. Servo signals (namely, focusing error signal and tracking error signal) are detected by using the output of the photodetector 24. This point will now be described hereinbelow.

A detection of the magneto-optic signal in which the reduction of the light amount due to an influence by the dust on the magneto-optic disk 7 (influence by the light shielding) in the third embodiment will now be described.

In FIG. 24, the light beam 209 reflected by the reflecting surface 4b of the beam splitter 4 is converted into the convergent light by the lens 15. After that, the convergent light 209 enters the polarization beam splitter 16. The polarization beam splitter 16 is polarization separating unit for separating the incident light beam into two polarized light beams whose polarizing directions perpendicularly cross and is rotated by 45° around the optic axis of incidence. The polarization beam splitter 16 polarizes and separates the incident convergent light 209 into two light beams whose planes of polarization perpendicularly cross, namely, into a P polarized light 209p as a transmission light and an S polarized light 209s. Those polarized lights enter the photodetectors 328 and 327, respectively.

Figures 25A, 25B:
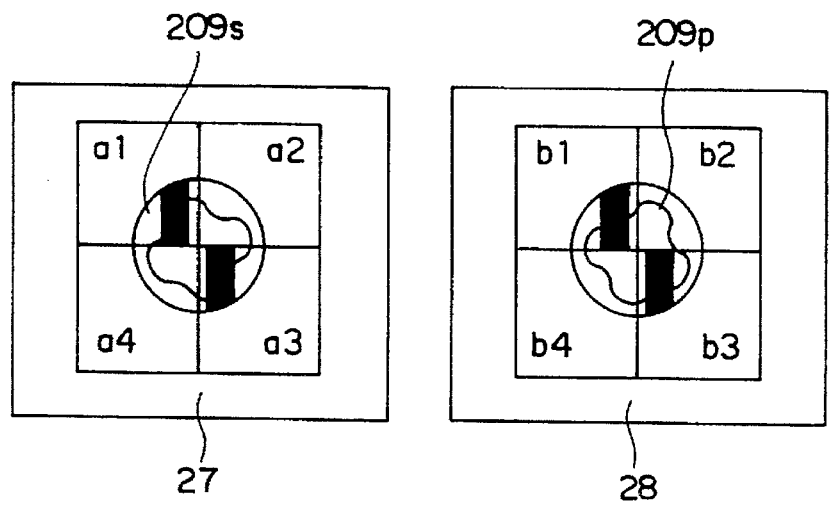
FIGS. 25A and 25B are front views showing an example of a photodetector to obtain a reproduction magneto-optic signal in FIG. 24 and a light spot of incidence there.

FIG. 25A shows the photodetector 327 and an incident spot of the s polarized light 209s. FIG. 25B shows the photodetector 328 and an incident spot of the P polarized light 209p.

As shown in FIG. 25A, the photodetector 327 is a 4-split photodetector having four light receiving regions a1 to a4 and generates signals (a1+a3) and (a2+a4) each corresponding to the sum of the photo currents of the two light receiving regions with the diagonal positional relation. Similarly, as shown in FIG. 25B, the photodetector 328 is also a 4-split photodetector having four light receiving regions b1 to b4 and generates signals (b1+b3) and (b2+b4) each corresponding to the sum of photo currents of the two light receiving regions with the diagonal positional relation.

Figure 7A:
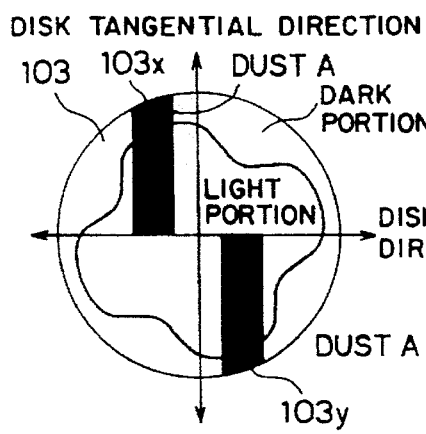
FIGS. 7A and 7B are conceptual diagrams for explaining an example of a cause of a fluctuation of a magneto-optic signal due to a dust on the surface of the magneto-optic disk.
Figure 7B:
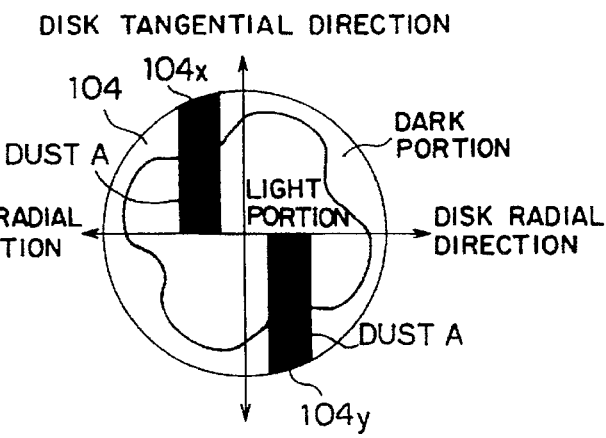
Figure 8A:
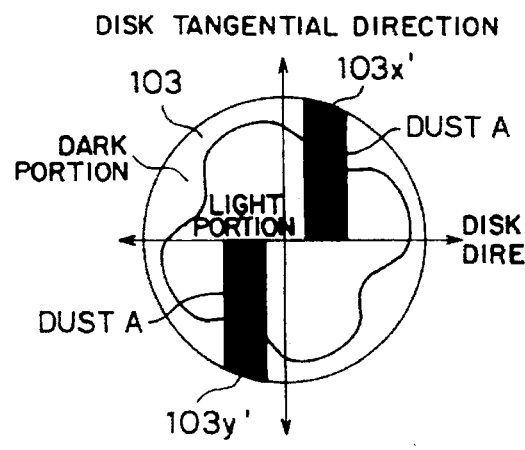
FIGS. 8A and 8B are conceptual diagrams for explaining an example of a cause of a fluctuation of the magneto-optic signal due to a dust on the surface of the magneto-optic disk.
Figure 8B:
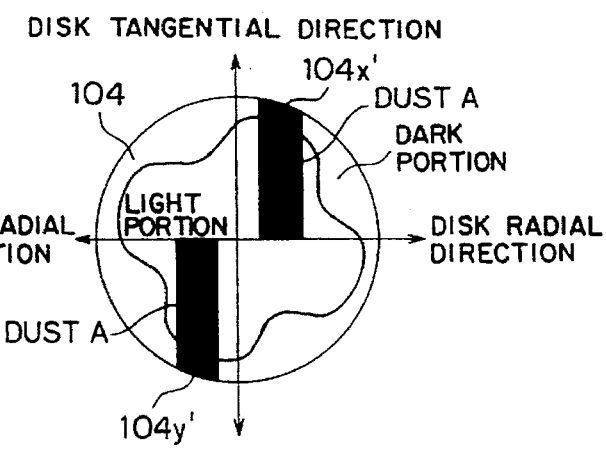
Figure 9:
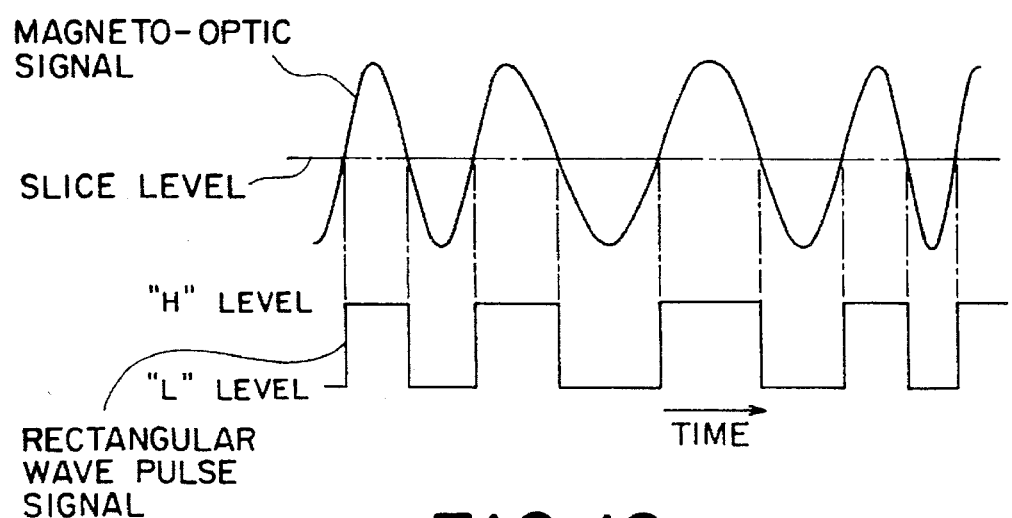
FIG. 9 is a waveform diagram for explaining a step of a signal process for demodulating a waveform of the magneto-optic signal into a data signal.

The photodetector 327 is arranged so that a boundary line between the arrangement of the light receiving regions a1 and a4 and the arrangement of the light receiving regions a2 and a3 coincides with the center line of the image on the information track in the incident spot 209s. Similarly, the photodetector 328 is also arranged so that a boundary line between the arrangement of the light receiving regions b1 and b4 and the arrangement of the light receiving regions b2 and b3 coincides with the center line of the image on the information track in the incident spot 209p. Therefore, when a light shielding member such as a dust or the like exists on the information track, as already described in FIGS. 7 and 8, the light reception amounts in the two light receiving regions with the same diagonal positional relation decrease. In FIG. 25A, in the photodetector 27, the light reception amounts decrease in the light receiving regions a1 and a3 due to an influence by the dust. In FIG. 25B, at the same time, even in the photodetector 328, there is a reduction of the light reception amounts in the light receiving regions b1 and b3 due to the influence by the dust. Therefore, there is a reduction of the light amount due to the dust in the sum signal (a1+a3) which is generated from the photodetector 327. At the same time, there is a reduction of the light amount due to the dust in the sum signal (b1+b3) which is generated from the photodetector 328.

Figure 26:
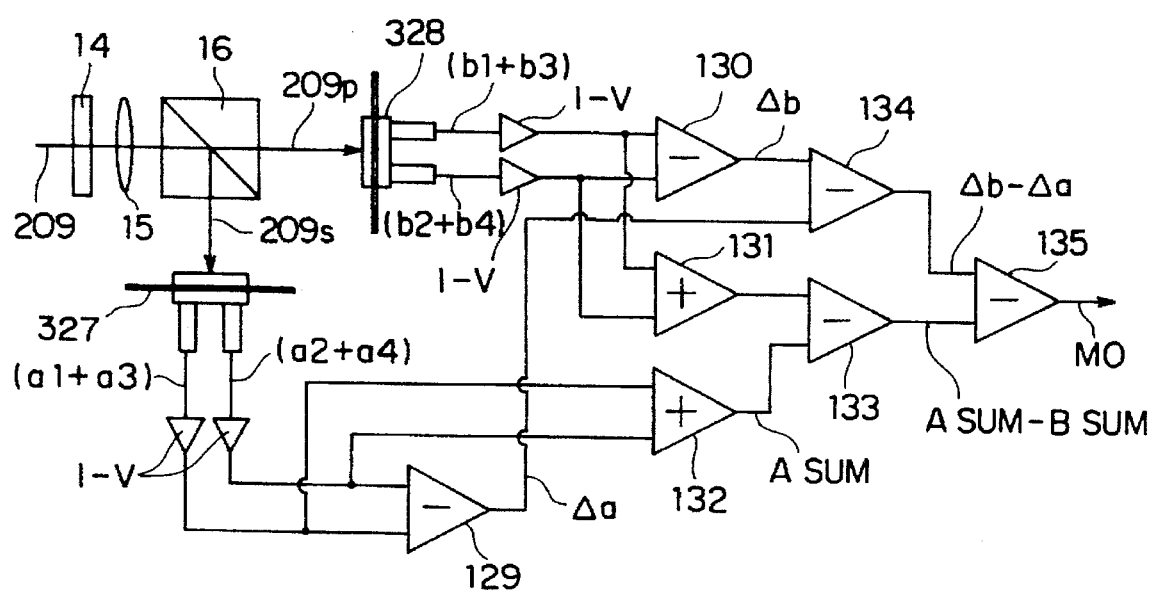
FIG. 26 is a schematic circuit constructional diagram showing a signal processing system for forming a reproduction magneto-optic signal by processing an output of the photodetector in the embodiment shown in FIG. 24.

FIG. 26 is a constructional diagram showing one specific example of a signal processing circuit to obtain a reproduction magneto-optic signal in which the influence by the dust on the magneto-optic disk 7 was eliminated by processing the outputs of the photodetectors 327 and 328. Reference numerals 129 and 130 denote subtracters; 131 and 132 adders; and 133 to 135 subtracters. The portions corresponding to those in FIG. 24 are designated by the same reference numerals.

In the diagram, each of the sum signals (a1+a3) and (a2+a4) which are generated from the photodetector 327 are converted into voltage signals by a current-voltage converter I-V, respectively, and after that, they are arithmetically operated by the subtracter 129. A decrease amount $\alpha a$ of the light amount of the light beam 209s due to the influence by the dust on the magneto-optic disk 7 (influence by the light shielding) is obtained. The sum signals (b1+b3) and (b2+b4) which are generated from the photodetector 328 are also converted into voltage signals by the current-voltage converter I-V and, after that, they are subtracted by the subtracter 130. A decrease amount $\Delta b$ of the light amount of the light beam 209p due to the influence by the dust on the magneto-optic disk 7 (influence by the light shielding) is obtained. A subtraction is executed to the decrease amounts $\Delta a$ and $\Delta b$ by the subtracter 134, so that a difference ($\Delta b - \Delta a$) is derived.

The sum signals (a1+a3) and (a2+a4) are added by the adder 132, thereby obtaining an A sum (a1+a2+a3+a4). Similarly, the sum signals (b1+b3) and (b2+b4) are also added by the adder 131, thereby obtaining a B sum (b1+b2+b3+b4). A subtraction is executed between the A sum and the B sum by the subtracter 133, thereby obtaining a difference signal (A sum−B sum). Namely, $$A\ \text{sum} - B\ \text{sum} = (a1+a2+a3+a4) - (b1+b2+b3+b4)$$

is obtained.

The difference signal (A sum−B sum) is a target reproduction magneto-optic signal. When a dust or the like exists on the information track of the magneto-optic disk, however, an S-shaped fluctuation of the DC level as shown in FIG. 3 occurs as described above.

Now, assuming that the A sum and B sum when the light beams 209s and 209p are not influenced by the dust or the like are set to $A_0$ and $B_0$, an A sum $A_1$ and a B sum $B_1$ when the light amounts of the light beams 209s and 209p decreased due to the influence by the dust or the like become as follows, respectively.

$$A_1 = A_0 - \Delta a \text{ and } B_1 = B_0 - \Delta b$$

Therefore, the difference signal (A sum−B sum) which is outputted from the subtracter 133 becomes $$A_1 - B_1 = (A_0 - \Delta a) - (B_0 - \Delta b)$$
$$= (A_0 - B_0) + (\Delta b - \Delta a)$$

($A_0 - B_0$) is the reproduction magneto-optic signal to be obtained. ($\Delta b - \Delta a$) is a fluctuation component $\Delta MO$ which causes the DC level to be fluctuated like an S-shape as shown in FIG. 3.

The fluctuation component $\Delta MO$ is obtained by the subtracter 134 as mentioned above. The difference signal (A sum−B sum) obtained by the subtracter 133 is further supplied to the subtracter 135 and the difference ($\Delta b - \Delta a$) obtained by the subtracter 134 is subtracted. Thus, the difference signal (A sum−$\Delta$B sum) from which the fluctuation component ΔM0 was eliminated, namely, a reproduction magneto-optic signal MO in which the DC level is stable by eliminating the influence by the dust or the like is derived from the subtracter 135.

Figure 27:
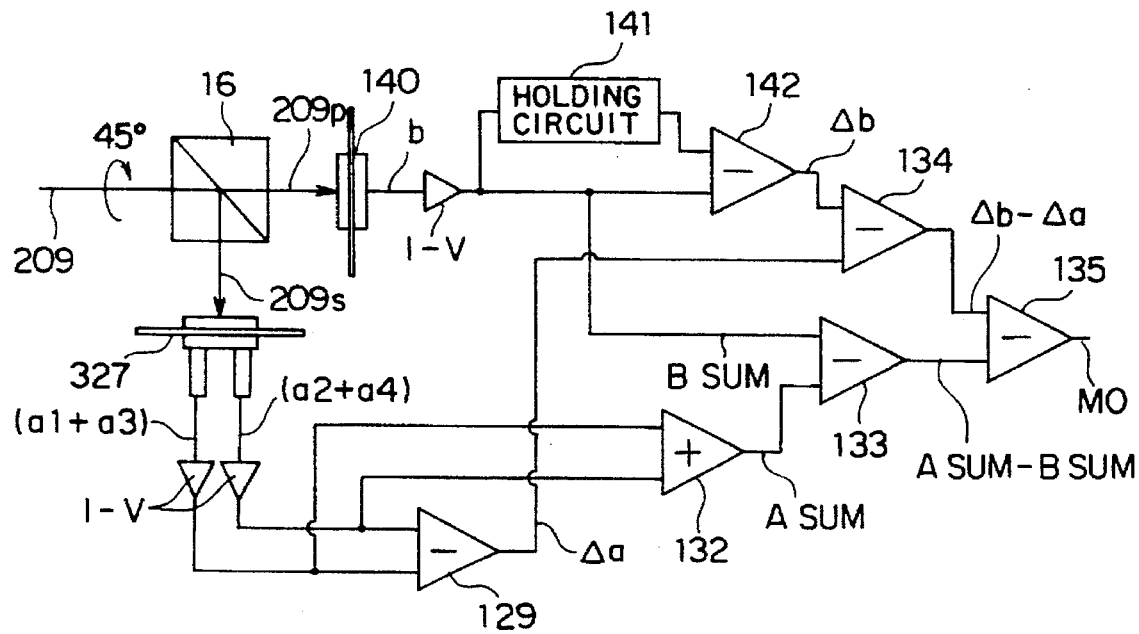
FIG. 27 is a schematic circuit constructional diagram showing a main section of another embodiment of the magneto-optic disk apparatus according to the invention.

FIG. 27 is a constructional diagram showing a main section of the fourth embodiment of a magneto-optic disk apparatus according to the invention. Reference numeral 140 denotes a photodetector; 141 a holding circuit; and 142 a subtracter. The portions corresponding to those in FIG. 26 are designated by the same reference numerals.

Figures 28A, 28B:
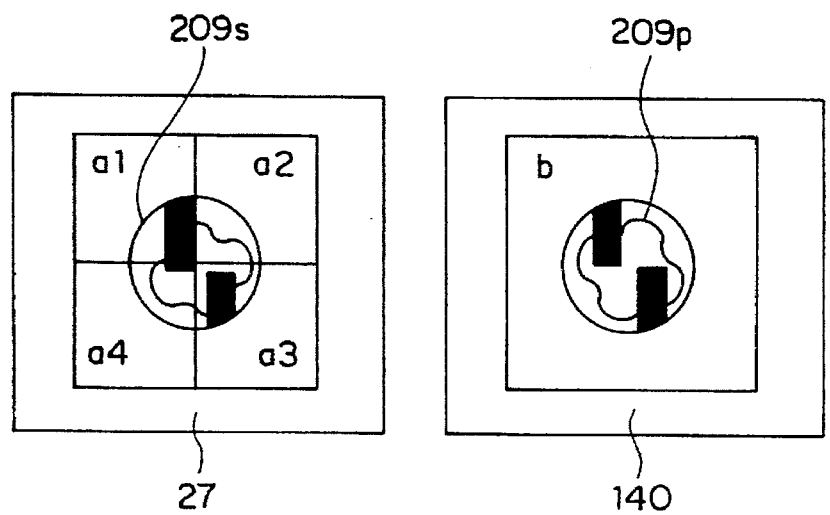
FIGS. 28A and 28B are front views showing one specific example of the photodetector in FIG. 27 and a light spot of incidence there.

In the diagram, according to the embodiment, as shown in FIG. 28A, the photodetector 327 for receiving the light beam 209s is a 4-split photodetector similar to the photodetector 27 shown in FIGS. 26 and 25A in the above embodiment. However, as shown in FIG. 28B, the photodetector 140 for receiving the light beam 209p is a photodetector having one light receiving region b. Unit for detecting the decrease light amount Δb of the light beam 209p due to the dust or the like by using the photodetector 140 differs from that in the foregoing first embodiment.

Namely, an output b' of the photodetector 140 when there is no decrease light amount Δb due to the influence by the dust (influence by the light shielding) in the light beam 209p is previously held in a holding circuit 141 and is always supplied to a subtracter 142. The output level b' is held by a learning or is selectively held. The signal b' held in the holding circuit 141 and the output b of the photodetector 140 are supplied to the subtracter 142, thereby obtaining a difference (b'−b). This difference is the decrease light amount Δb of the light beam 209p due to the influence by the dust on the magneto-optic disk 7 (influence by the light shielding).

The processes after that are similar to those in the foregoing third embodiment. The difference (Δb−Δa) between the decrease amounts Δb and Δa of the light amounts from the subtracters 142 and 129 is obtained by the subtracter 134. The difference (Δb−Δa) is subtracted from the difference signal (A sum−B sum) from the subtracter 133 by the subtracter 135, thereby obtaining the magneto-optic signal MO in which the decrease in light amount due to the influence by the dust on the magneto-optic disk 7 (influence by the light shielding) was corrected.

Figure 29:
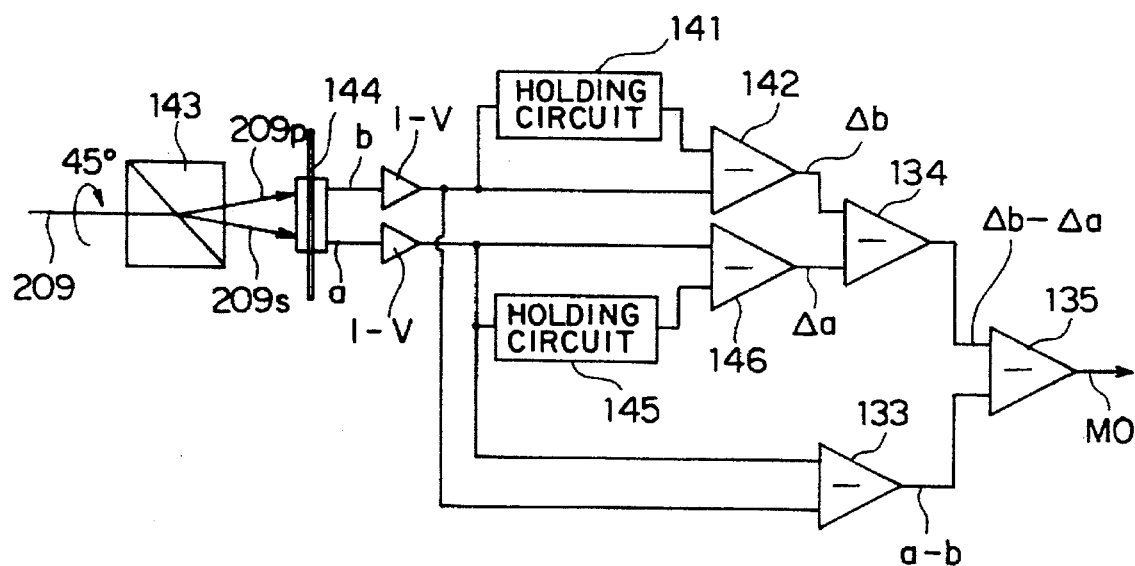
FIG. 29 is a schematic circuit constructional diagram showing a main section of another embodiment of the magneto-optic disk apparatus according to the invention.

FIG. 29 is a constructional view showing a main section of the fifth embodiment of a magneto-optic disk apparatus according to the invention. Reference numeral 143 denotes a Wollaston prism 144; a photodetector; 145 a holding circuit; and 146 a subtracter. The portions corresponding to those in FIG. 27 are designated by the same reference numerals.

In the diagram, the convergent light 209 is polarized and separated into two light beams whose polarizing directions perpendicularly cross, namely, into the P polarized light 209p and S polarized light 209s by the Wollaston prism 143 which is polarization separating unit for separating the incident light beam into two polarized light beams whose polarizing directions perpendicularly cross and which is rotated by 45° around the optic axis of incidence. The P and S polarized light beams 209p and 209s enter the photodetector 144, respectively.

Figure 30:
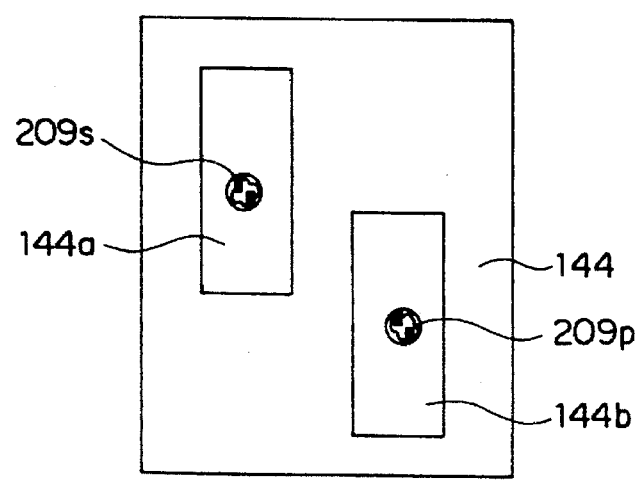
FIG. 30 is a front view showing one specific example of the photodetector in the embodiment shown in FIG. 29 and a light spot of incidence there.

As shown in FIG. 30, the photodetector 144 has two light receiving regions 144a and 144b. The light beam 209s enters the light receiving region 144a. The light beam 209p enters the light receiving region 144b. An output a according to the light reception amount of the light receiving region 144a and an output b according to the light reception amount of the light receiving region 144b are obtained, respectively.

In FIG. 29, the outputs a and b of the photodetector 144 when there is no decrease amount of the light amounts due to the influence by the dust (influence by the light shielding) are previously held as output levels a' and b' in the holding circuits 141 and 145 and are always supplied to the subtracters 142 and 146, respectively. The output levels a' and b' are held by a learning or are selectively held.

The outputs a and b of the photodetector 144 are supplied to the subtracters 142 and 146 and are subjected to subtracting processes with the outputs a and b' of the holding circuits 141 and 145, thereby obtaining the decrease amounts Δa and Δb of the light amounts of the light beams 209s and 209p due to the influence by the dust on the magneto-optic disk 7 (influence by the light shielding). The decrease light amounts Δa and Δb are supplied to the subtracter 134, so that a difference (Δb−Δa) between them is obtained.

The outputs a and b of the photodetector 144 are the same as the A sum and B sum in the foregoing first embodiment. By supplying the outputs a and b to the subtracter 133, a difference signal (a−b) is obtained. The difference (Δb−Δa) from the subtracter 134 is subtracted from the difference signal (a−b) by the subtracter 135, thereby obtaining the magneto-optic signal MO in which the decrease in light amount due to the influence by the dust on the magneto-optic disk 7 (influence by the light shielding) was corrected.

Figure 31:
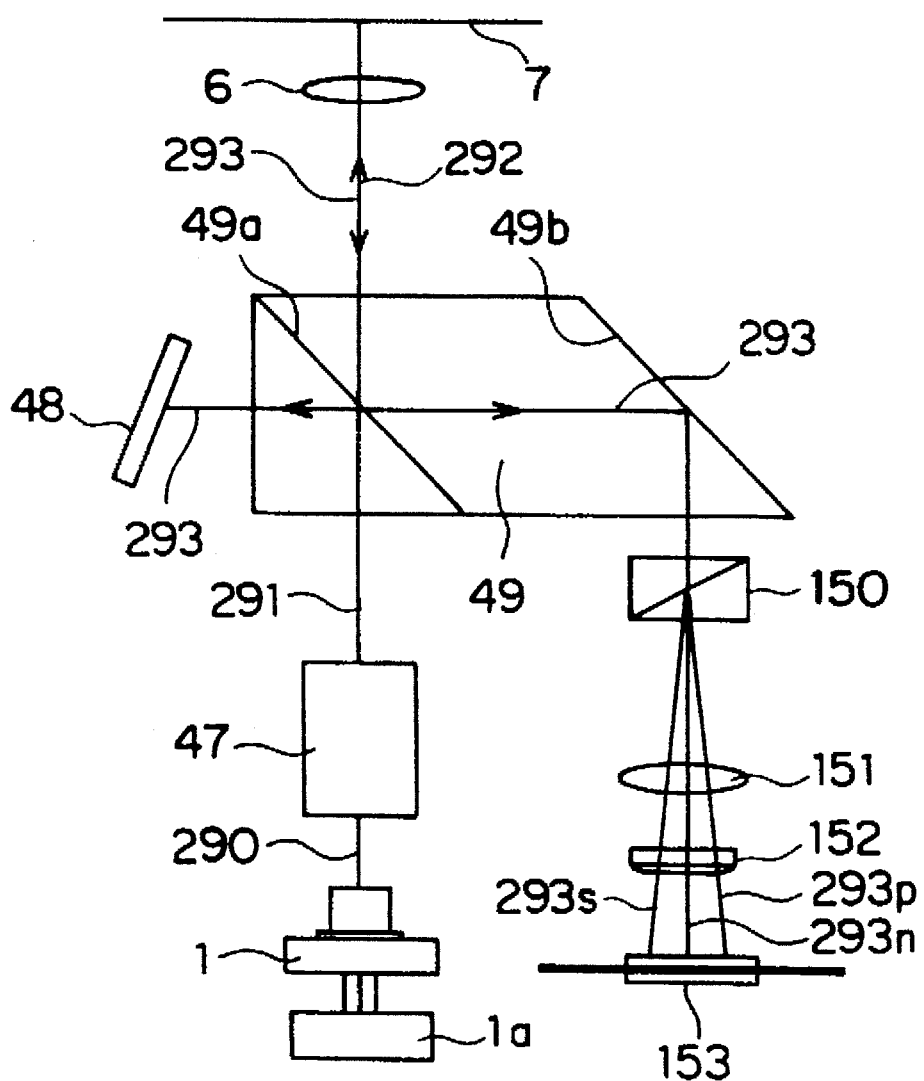
FIG. 31 is a schematic circuit constructional diagram showing a main section of another embodiment of the magneto-optic disk apparatus according to the invention.

FIG. 31 is a constructional diagram showing a main section of the sixth embodiment of a magneto-optic disk apparatus according to the invention. Reference numeral 47 denotes a collimator lens; 48 a photodetector; 49 a beam splitter; 49a a reflecting surface; 49b a total reflecting surface; 150 polarization separating unit; 151 a detecting lens; 152 a cylindrical lens; and 153 a photodetector. The portions corresponding to those in the foregoing drawings are designated by the same reference numerals.

In the diagram, the high frequency multiplexing circuit 1a to reduce noises of the semiconductor laser 1 is provided for the semiconductor laser 1. The divergent light beam 290 emitted from the semiconductor laser 1 is converted into the parallel light beam 291 by the collimator lens 47. After that, the parallel light beam 291 enters the beam splitter 49. Reflectances and transmittances of the reflecting surface 49a of the beam splitter 49 are different with respect to the P polarized light and the S polarized light. For example, the reflecting surface 49a has the polarization characteristics such that the transmittance Tp of the P polarized light is (Tp≈0.75), the reflectance Rp of the P polarized light is (Rp≈0.25),..the transmittance Ts of the S polarized light is (Ts≈0), and the reflectance Rs of the S polarized light is (Rs≈1). Thus, the light beam 291 of the P polarized light entering the reflecting surface 49a is divided into two lights of the transmission light 292 and reflected light 293.

The reflected light 293 in those lights enters the photodetector 48. The photodetector 48 is arranged obliquely for the optic axis of the light beam 293 in order to take a countermeasure for the stray light (countermeasure for preventing that the unnecessary light which is reflected by the incident surface, namely the stray light enters the semiconductor laser 1 or other photodetectors). In accordance with a detection output of the photodetector 48, the light intensity of the light beam 290 which is emitted from the semiconductor laser 1 is controlled. The detailed description about such a control is omitted here because it is not essentially related to the present invention.

On the other hand, after the progressing direction of the light beam 292 which was transmitted through the reflecting surface 49a of the beam splitter 49 was changed by a reflecting mirror (not shown) (in this instance, this state is shown as if the light beam 292 progresses straight for the purpose of simplicity of drawing), the light beam is irradiated onto the magneto-optic disk 7 by the objective lens 6.

The reflected light beam 293 from the magneto-optic disk 7 becomes a parallel light beam by the objective lens 6 and is reflected by the reflecting surface 49a of the beam splitter 49. The light beam is further reflected by the total reflecting surface 49b and is emitted from the beam splitter 49. The emitted light beam 293 enters the polarization separating unit 150 constructed by, for example, a birefringence medium or the like and is separated into three light beams comprising two polarized light beams whose polarizing directions perpendicularly cross with each other, namely, a P polarized light 293p, an S polarized light 293s, and a light beam 293n obtained by synthesizing the P polarized light component and the S polarized light component. Those light beams become convergent lights by the detecting lens 151 and an astigmatism for detection of a focusing error is given to the convergent lights by the cylindrical lens 152. After that, the convergent lights enter the photodetector 153, respectively.

Figure 32:
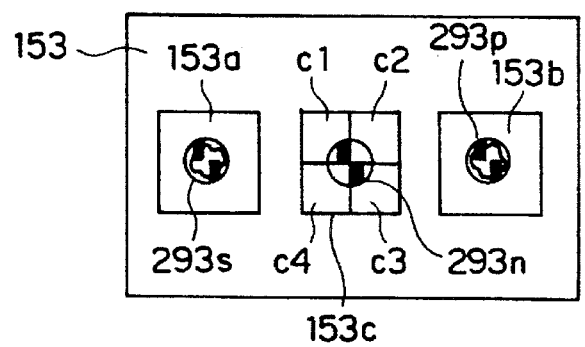
FIG. 32 is a front view showing one specific example of a photodetector to form a reproduction magneto-optic signal in the embodiment shown in FIG. 31 and a light spot of incidence there.

FIG. 32 is a constructional diagram showing one specific example of the photodetector 153. Reference numerals 153a to 153c denote photosensitive elements.

In the diagram, the photodetector 153 has the three photosensitive elements 153a to 153c. The S polarized light beam 293s enters the photosensitive element 153a. The photosensitive element 153a is constructed by one light receiving region. The P polarized light beam 293p enters the photosensitive element 153b. The photosensitive element 153b is constructed by one light receiving region. The light beam 293n enters the photosensitive element 153c. The photosensitive element 153c is a 4-split photosensitive element comprising four light receiving regions c1 to c4. The photosensitive element 153c is arranged in a manner such that a boundary line between the arrangement of the light receiving regions c1 and c4 and the arrangement of the light receiving regions c2 and c3 coincides with the center line of the information track in a light spot of the light beam 293n.

Outputs according to the light reception amounts of the photosensitive elements 153a and 153b are set to a and b and outputs according to the light reception amounts of the light receiving regions c1, c2, c3, and c4 of the photosensitive element 153c are set to c1, c2, c3, and c4, respectively.

Figure 33:
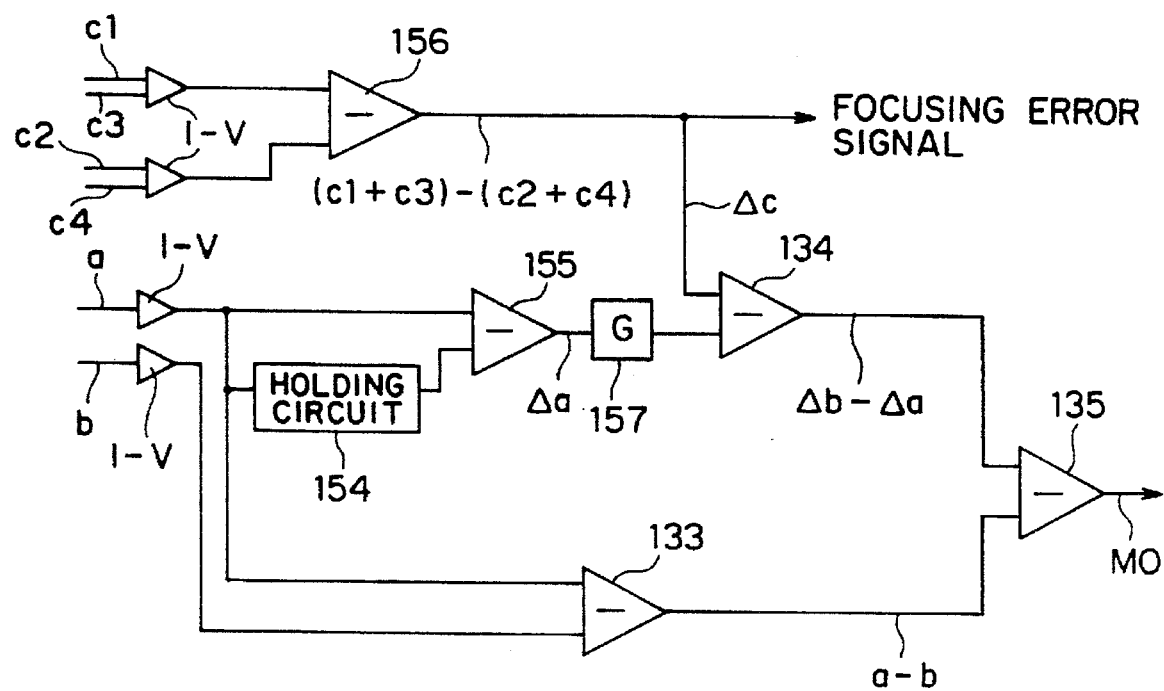
FIG. 33 is a schematic circuit constructional diagram showing a signal processing system to form the reproduction magneto-optic signal in the embodiment shown in FIG. 31.

FIG. 33 is a constructional diagram showing one specific example of a processing circuit for processing the outputs of the photodetector 153 mentioned above. Reference numeral 154 denotes a holding circuit; 155 and 156 subtracters; and 157 a gain correcting circuit. The portions corresponding to those in FIG. 29 are designated by the same reference numerals.

In the diagram, an output a of the photodetector 153 when there is no decrease amount of the light amount due to the influence by the dust on the magneto-optic disk 7 (influence by the light shielding) is previously held in the holding circuit 154 as an output a' and is always supplied to the subtracter 155. The output a is held by a learning or is selectively held.

The output a of the photodetector 153 is supplied to the subtracter 155 and is subjected to a subtracting process with the output a' of the holding circuit 154, thereby obtaining the decrease amount Δa of the light amount of the S polarized light beam 293a due to the influence by the dust on the magneto-optic disk 7 (influence by the light shielding). The decrease amount Δa of the light amount is corrected by the gain correcting circuit 157 of a gain G and is supplied to the subtracter 135 as an amount of (G×Δa).

Outputs c1 and c3 of the light receiving regions c1 and c3 with the diagonal positional relation of the photodetector 153 are added, thereby obtaining a sum signal (c1+c3).

Similarly, outputs c2 and c4 of the light receiving regions c2 and c4 with the diagonal positional relation of the photodetector 153 are added, thereby obtaining a sum signal (c2+c4). Those sum signals are subjected to a subtracting process by the subtracter 156, thereby obtaining an output {(c1+c3) −(c2+c4)}. This difference output is a decrease amount Δc of the light amount due to the influence by the dust of the light beam 293 before it enters the polarization separating unit 150 (FIG. 31).

The decrease light amount Δc is supplied to the subtracter 135 and is subjected to a subtracting process with the decrease light amount Δc from the subtracter 156, so that a difference (Δc−G×Δa) is obtained.

On the other hand, the outputs a and b of the photodetector 153 are subjected to a subtracting process by the subtracter 133, thereby obtaining a difference signal (a−b) between them. The difference signal (a−b) is a reproduction magneto-optic signal including the fluctuation component ΔMO due to the influence by the dust on the magneto-optic disk 7. The gain G of the gain correcting circuit 157 is properly adjusted so that the difference (Δc−G×Δa) which is outputted from the subtracter 135 is equalized to the fluctuation component ΔMO of the difference signal (a−b) which is outputted from the subtracter 133. The gain G is set in consideration of a separation ratio for the incident light beam 293 of the light beam 293n separated by the polarization separating unit 150. By subtracting the difference (Δc−G×Δa) from the difference signal (a−b) by the subtracter 135, therefore, the magneto-optic signal MO in which the decrease in light amount due to the influence by the dust on the magneto-optic disk 7 (influence by the light shielding) was corrected is obtained.

An output of the subtracter 156 can be also used as a focusing control signal by an astigmatism method.

In the embodiment, the light beam 292 which was transmitted through the reflecting surface 49a of the beam splitter 49 in the parallel light beam 291 emitted from the semiconductor laser 1 has been irradiated onto the magneto-optic disk 7. However, it is also possible to construct in a manner such that the polarization characteristics of the reflecting film 49a can be also set such that, for example, the transmittance Tp of the P polarized light is (Tp≈1), the reflectance Rp of the P polarized light is (Rp≈0), the transmittance Ts of the S polarized light is (Ts≈0.2), and the reflectance Rs of the S polarized light is (Rs≈0.8), the parallel light beam 291 emitted from the semiconductor laser 1 is reflected by the total reflecting surface 49b, and further, the light beam reflected by the reflecting surface 49a is irradiated onto the magneto-optic disk 7. In this case, the reflected light beam 293 of the magneto-optic disk 7 is transmitted through the reflecting surface 49a and enters the polarization separating unit 150.

By the above embodiment, the magneto-optic signal MO in which the decrease in light amount due to the influence by the dust on the magneto-optic disk was corrected is obtained. This method is not limited to the construction of the embodiment. For example, the same effect is obtained by the construction (FIG. 24) of the third embodiment. Namely, in place of the 4-split light receiving regions c1 to c4 of the photodetector 79 in the embodiment, the 4-split light receiving regions a1 to a4 of the photodetector 24 shown in FIG. 24 and, in place of the light receiving regions c1 and c2 for the magneto-optic signal, the photodetectors 327 and 328 are used in the optical head in FIG. 24, so that the same effect is obtained. Namely, the same effect can be accomplished by providing a photodetector other than the photodetector for the magneto-optic signal, for example, the 4-split photodetector to detect the focusing error signal due to the astigmatism method.

As mentioned above, according to the embodiment, by using a construction such that at least one of the light beams emitted from the analyzer for polarizing and separating the reflected light from the disk is detected by the 4-split photodetector or a construction such that the light amount which is not influenced by the dust is selectively detected by using the holding circuit, the fluctuation of the DC level of the reproduction magneto-optic signal due to the influence by the dust or the like on the magneto-optic disk is corrected and the good reproduction magneto-optic signal can be obtained.

In the above embodiment, as a construction such that the light amount without the influence by the dust is selectively detected by using the holding circuit, for example, it is possible to construct in a manner such that the signals are selectively detected (light amounts which are detected at predetermined locations on the magneto-optic disk 7 or are detected at every predetermined intervals), the light amount without a decrease in light amount among the values (a level difference occurs in the signal level depending On the presence or absence of the dust) is set to the light amount without the influence by the dust, and this value is held as a comparison value (normal value) in the holding circuit.

Although the above embodiment has been described with respect to the fluctuation of the DC level of the reproduction magneto-optic signal due to the influence by the dust on the magneto-optic disk 7, the invention is not limited to such an example. For example, the same effect can be obtained even for the fluctuation of the DC level of the reproduction magneto-optic signal occurring due to a scratch on the magneto-optic disk 7 or a foreign matter or the like mixed onto the recording film in the magneto-optic disk 7 occurring upon manufacturing of the magneto-optic disk 7 or the like.

According to the invention as described above, the level fluctuation of the reproduction magneto-optic signal due to a dust, scratch, or the like on the magneto-optic disk can be corrected and the good reproduction magneto-optic signal can be obtained. A magneto-optic disk causes a reduction of S/N ratio due to a reduction of signal level and/or an increment of noise even when there is no dust, in comparison with the magneto-optic disk using no birefringence material such as glass. However, according to the present invention there can provide a magneto-optic disk capable of increasing S/N ratio even when there is no dust since the birefringence can be corrected according to the present invention. The present invention is not limited to the embodiments above mentioned. Various modified embodiments in the scope of claims are included in the present invention.

What is claimed is:

1. A magneto-optic disk apparatus for use with a magneto-optic disk in which a recording surface made of a magneto-optic information recording medium is formed on a transparent substrate having a birefringence, the magneto-optic disk apparatus comprising:

an optical head for performing a recording and a reproduction by a laser beam for the recording surface; and a unit for eliminating a fluctuation component occurring in a reproduction magneto-optic signal, the fluctuation component eliminating unit being arranged in a convergent light up to an analyzer in a detection optical system.

2. An apparatus according to claim 1, wherein the fluctuation component eliminating unit is a parallel flat plate having an incident surface and an emitting surface parallel to the incident surface, the parallel flat plate being arranged in the convergent light such that the convergent light is incident on the incident surface of the parallel flat plate with an optic axis of the convergent light being perpendicular to the incident surface of the parallel flat plate, the parallel flat plate being made of a positive uniaxial anisotropy crystal having an optic axis which is perpendicular to the incident surface and the emitting surface of the parallel flat plate.

3. A magneto-optic disk apparatus for use with a magneto-optic disk in which a recording surface made of a magneto-optic information recording medium is formed on a transparent substrate having a birefringence, the magneto-optic disk apparatus comprising:

an optical head for performing a recording and a reproduction by a laser beam for the recording surface; and a unit for eliminating a fluctuation component occurring in a reproduction magneto-optic signal;

wherein the optical head includes a polarization separating unit for separating light into a first polarized light beam and a second polarized light beam, a first photodetector for receiving the first polarized light beam, and a second photodetector for receiving the second polarized light beam, at least one of the first photodetector and the second photodetector being a 4-split photodetector; and wherein the fluctuation component eliminating unit includes means for detecting a level fluctuation component of the reproduction magneto-optic signal by arithmetically operating sum signals in light receiving regions with a diagonal positional relation among four light receiving regions of the 4-split photodetector, and means for subtracting the level fluctuation component from the reproduction magneto-optic signal.

4. A magneto-optic disk apparatus with an optical head having at least:

a laser device for emitting a laser light beam;

an objective lens for converging the laser light beam and irradiating said laser light beam as a light spot onto a magneto-optic information recording medium (recording surface) of a magneto-optic disk having said recording surface on a transparent substrate having a birefringence and for converging the laser light beam reflected on said recording surface;

a beam splitter for guiding the laser light beam emitted from said laser device to said objective lens, for simultaneously separating a part of said laser beam, for separating the reflected light beam from said recording surface from an optical path connecting said laser device and said magneto-optic disk, and for guiding the separated light beam to a detection optical system;

an analyzer for separating the laser beam separated by said beam splitter in the reflected light beam from said recording surface into two polarized light beams whose polarizing directions perpendicularly cross;

a birefringence correcting unit having an optical anisotropy arranged in a convergent light up to said analyzer in said detection optical system; and a photodetector for detecting at least two polarized light beams which were polarized and separated by said analyzer;

wherein said birefringence correcting unit is a parallel flat plate having an incident surface and an emitting surface parallel to the incident surface, the parallel flat plate being arranged in the convergent light such that the convergent light is incident on the incident surface of the parallel flat plate with an optic axis of the convergent light being perpendicular to the incident surface of the parallel flat plate, the parallel flat plate being made of a positive uniaxial anisotropy crystal having an optic axis which is perpendicular to the incident surface and the emitting surface of the parallel flat plate.

5. An apparatus according to claim 4, wherein said birefringence correcting unit is a parallel flat plate using $LiTaO_3$ (tantalum) as a positive uniaxial anisotropy crystal as a material.

6. An apparatus according to claim 4, wherein said birefringence correcting unit is a parallel flat plate using $TiO_2$ (rutile) as a positive uniaxial anisotropy crystal as a material.

7. An apparatus according to claim 4, wherein said birefringence correcting unit is a parallel flat plate using a quartz having a right rotatory polarization as a positive uniaxial anisotropy crystal as a material and a parallel flat plate using a quartz having a left rotatory polarization as a material.

8. An apparatus according to claim 4, wherein said birefringence correcting unit is constructed by arranging parallel flat plates using a negative uniaxial anisotropy crystal as a material such that optical axes of said parallel flat plates perpendicularly cross with each other and said parallel flat plates cross perpendicularly to an optic axis of incidence.

9. A magneto-optic disk apparatus with an optical head which has at least a semiconductor laser for emitting a laser light beam, an objective lens for converging said laser light beam, for irradiating the converged laser light beam as a light spot onto a recording surface formed with information tracks in a magneto-optic disk in which a magneto-optic information recording medium is provided on a transparent substrate, and for converging the laser light beam reflected from said recording surface, a first beam splitter for guiding the laser light beam emitted from said semiconductor laser to said objective lens, for separating a part of said laser beam, and for separating the reflected light beam from the recording surface of said magneto-optic disk from an optical path connecting said semiconductor laser and said magneto-optic disk, and a second beam splitter for reflecting a part of the laser light beam separated by said first beam splitter from the laser light beam reflected from said recording surface, for transmitting another part of said laser light beam, and for separating the transmitted laser light beam into two light beams of a reflected light beam and a transmission light beam, wherein the transmission light beam separated by said second beam splitter is separated into two polarized light beams whose polarizing directions perpendicularly cross with each other by a polarization separating unit, a reproduction magneto-optic signal is detected by differentially detecting, and at least a focusing error signal according to a size of a spot diameter of the light spot which is irradiated onto said magneto-optic information recording medium and a tracking error signal according to a positional deviation amount from said information track of the light spot that is irradiated onto the magneto-optic information recording medium of said magneto-optic disk are detected from the reflected light beam separated by said second beam splitter, wherein at least one of first and second photodetectors for receiving the two polarized light beams which were polarized and separated by said polarization separating unit is set to a 4-split photodetector, and wherein sum signals in light receiving regions with a diagonal positional relation among four light receiving regions of said 4-split photodetector are arithmetically operated, a level fluctuation component of the reproduction magneto-optic signal is detected, and said detected level fluctuation component is subtracted from said reproduction magneto-optic signal.

10. An apparatus according to claim 9, wherein said focusing error signal is detected by an astigmatism method and said focusing error signal is arithmetically operated, thereby obtaining the level fluctuation component of said reproduction magneto-optic signal which is subtracted from said reproduction magneto-optic signal.

11. A magneto-optic disk apparatus with an optical head which has at least a semiconductor laser for emitting a laser light beam, an objective lens for converging said laser light beam, for irradiating the converged laser light beam as a light spot onto a recording surface formed with information tracks in a magneto-optic disk in which a magneto-optic information recording medium is provided on a transparent substrate, and for converging the laser light beam reflected from said recording surface, and a first beam splitter for guiding the laser light beam emitted from said semiconductor laser to said objective lens, for separating a part of said laser beam, and for separating the reflected light beam from said recording surface from an optical path connecting said semiconductor laser and said magneto-optic information recording medium of said magneto-optic disk, wherein the transmission light beam separated by said first beam splitter is separated by a polarization separating unit into at least first and second polarized light beams whose polarizing directions perpendicularly cross with each other and a third polarized light beam obtained by synthesizing said two polarized light components, a magneto-optic signal is detected by differentially detecting said first and second light beams, and at least a focusing error signal according to a size of spot diameter of said light spot which is irradiated onto said magneto-optic information recording medium from said third light beam is detected, and wherein said focusing error signal is detected by an astigmatism method, a level fluctuation component of said reproduction magneto-optic signal is obtained by arithmetically operating said focusing error signal, and said level fluctuation component is subtracted from said reproduction magneto-optic signal, thereby obtaining the reproduction magneto-optic signal in which the level fluctuation was corrected.

12. An apparatus according to claim 9, 10, or 11, further having a holding circuit for holding at least one of outputs of the light beams which were polarized and separated by said polarization separating unit for a predetermined period of time.

\* \* \* \* \*